United States Patent
Rivera et al.

(10) Patent No.: US 10,656,427 B2
(45) Date of Patent: May 19, 2020

(54) MULTICORE FIBER-COUPLED OPTICAL PROBING TECHNIQUES

(71) Applicant: nLIGHT, Inc., Vancouver, WA (US)

(72) Inventors: Chris A. Rivera, Vancouver, WA (US); Roger L. Farrow, Vancouver, WA (US)

(73) Assignee: nLIGHT, Inc., Vancouver, WA (US)

( * ) Notice: Subject to any disclaimer, the term of this patent is extended or adjusted under 35 U.S.C. 154(b) by 0 days.

(21) Appl. No.: 15/933,183

(22) Filed: Mar. 22, 2018

(65) Prior Publication Data

US 2018/0217385 A1     Aug. 2, 2018

Related U.S. Application Data

(63) Continuation-in-part of application No. PCT/US2017/034848, filed on May 26, 2017, and a
(Continued)

(51) Int. Cl.
  *G02B 27/09* (2006.01)
  *G02B 6/028* (2006.01)
(Continued)

(52) U.S. Cl.
  CPC ..... *G02B 27/0994* (2013.01); *G02B 6/02042* (2013.01); *G02B 6/0281* (2013.01);
(Continued)

(58) Field of Classification Search
  CPC .................................................. G02B 27/0994
  See application file for complete search history.

(56) References Cited

U.S. PATENT DOCUMENTS

| 4,252,403 A | * | 2/1981 | Salisbury | ............... G02B 6/262 |
| | | | | 385/124 |
| 4,266,851 A | * | 5/1981 | Salisbury | ............. G02B 6/2551 |
| | | | | 250/227.24 |

(Continued)

FOREIGN PATENT DOCUMENTS

| CN | 101907742 A | * | 12/2010 |
| CN | 101907742 B | * | 7/2012 |

(Continued)

OTHER PUBLICATIONS

Bergmann et al., Effects of diode laser superposition on pulsed laser welding of Aluminum, Lasers in Manufacturing Conference 2013, Physics Procedia 41 ( 2013 ) 180-189 (Year: 2013).*
(Continued)

*Primary Examiner* — Peter Radkowski

(57) ABSTRACT

An optical beam delivery device establishes, from an optical beam, an optical trap that is moveable to different optical trap locations. The device has a first length of fiber through which the optical beam propagates along a propagation path and which has a first refractive index profile (RIP) enabling modification of the propagation path to form an adjusted optical beam movable to propagate along different propagation paths in response to different states of applied perturbation. The device also has a second length of fiber coupled to the first length of fiber and having confinement cores defining a second RIP. The confinement cores occupy different positions in, and correspond to the different optical trap locations at an output of, the second length of fiber.

26 Claims, 15 Drawing Sheets

Related U.S. Application Data continuation-in-part of application No. 15/607,399, filed on May 26, 2017, said application No. 15/933,183 is a continuation-in-part of application No. 15/607,410, filed on May 26, 2017, and a continuation-in-part of application No. 15/607,411, filed on May 26, 2017, now Pat. No. 10,295,845.

(60) Provisional application No. 62/401,650, filed on Sep. 29, 2016.

(51) Int. Cl.
  *G02B 6/14* (2006.01)
  *G02B 6/02* (2006.01)
  *G02B 6/26* (2006.01)
  *G02B 6/036* (2006.01)
  *G02B 6/255* (2006.01)

(52) U.S. Cl.
  CPC ........... *G02B 6/0288* (2013.01); *G02B 6/14* (2013.01); *G02B 6/262* (2013.01); *G02B 6/0365* (2013.01); *G02B 6/03611* (2013.01); *G02B 6/03627* (2013.01); *G02B 6/03633* (2013.01); *G02B 6/03638* (2013.01); *G02B 6/03688* (2013.01); *G02B 6/255* (2013.01); *G02B 27/0927* (2013.01)

(56) References Cited

U.S. PATENT DOCUMENTS

| | | | | |
|---|---|---|---|---|
| 4,475,027 A * | 10/1984 | Pressley | | B23K 26/0732 219/121.6 |
| 4,953,947 A * | 9/1990 | Bhagavatula | | G02B 6/0286 385/126 |
| 5,153,773 A * | 10/1992 | Muraki | | G02B 3/0056 359/211.1 |
| 5,475,415 A * | 12/1995 | Noethen | | B41J 2/45 347/238 |
| 5,566,196 A * | 10/1996 | Scifres | | G02B 6/02042 372/6 |
| 5,864,430 A * | 1/1999 | Dickey | | B23K 26/073 219/121.69 |
| 5,986,807 A * | 11/1999 | Fork | | G02B 5/1876 359/566 |
| 6,433,301 B1 * | 8/2002 | Dunsky | | B23K 26/073 219/121.67 |
| 6,434,302 B1 * | 8/2002 | Fidric | | G02B 6/2856 385/43 |
| 6,483,973 B1 * | 11/2002 | Mazzarese | | H01S 3/06708 372/6 |
| 6,496,301 B1 * | 12/2002 | Koplow | | G02B 6/14 359/337 |
| 6,639,177 B2 * | 10/2003 | Ehrmann | | B23K 26/032 219/121.68 |
| 6,779,364 B2 * | 8/2004 | Tankala | | C03B 37/01211 65/390 |
| 6,989,508 B2 * | 1/2006 | Ehrmann | | B23K 26/032 219/121.73 |
| 7,068,900 B2 * | 6/2006 | Croteau | | G02B 6/03605 385/126 |
| 7,116,887 B2 * | 10/2006 | Farroni | | C03B 37/01217 385/142 |
| 7,157,661 B2 * | 1/2007 | Amako | | B23K 26/0608 219/121.73 |
| 7,257,293 B1 * | 8/2007 | Fini | | G02B 6/02 385/123 |
| 7,463,805 B2 * | 12/2008 | Li | | H01S 3/06708 385/123 |
| 7,526,166 B2 * | 4/2009 | Bookbinder | | G02B 6/02366 385/123 |
| 7,537,395 B2 * | 5/2009 | Savage-Leuchs | | G02B 6/4296 372/6 |
| 7,622,710 B2 * | 11/2009 | Gluckstad | | G02B 21/06 250/251 |
| 7,628,865 B2 * | 12/2009 | Singh | | G21K 1/003 134/1 |
| 7,876,495 B1 * | 1/2011 | Minelly | | C03B 37/0122 359/341.1 |
| 7,924,500 B1 * | 4/2011 | Minelly | | G02B 6/023 359/341.1 |
| 8,184,363 B2 * | 5/2012 | Rothenberg | | G02B 6/02042 359/349 |
| 8,415,613 B2 * | 4/2013 | Heyn | | B82Y 35/00 250/251 |
| 8,711,471 B2 * | 4/2014 | Liu | | G02B 6/14 359/337 |
| 8,728,591 B2 * | 5/2014 | Inada | | G02B 1/04 428/1.31 |
| 9,170,367 B2 * | 10/2015 | Messerly | | G02B 6/02 |
| 9,322,989 B2 * | 4/2016 | Fini | | G02B 6/0288 |
| 9,325,151 B1 * | 4/2016 | Fini | | H01S 3/102 |
| 9,339,890 B2 * | 5/2016 | Woods | | B23K 26/06 |
| 9,366,887 B2 * | 6/2016 | Tayebati | | G02F 1/295 |
| 9,496,683 B1 * | 11/2016 | Kanskar | | H01S 3/137 |
| 2002/0146202 A1 * | 10/2002 | Reed | | A61B 5/0084 385/34 |
| 2002/0158052 A1 * | 10/2002 | Ehrmann | | B23K 26/032 219/121.69 |
| 2003/0032204 A1 | 2/2003 | Walt et al. | | |
| 2003/0059184 A1 * | 3/2003 | Tankala | | C03B 37/01211 385/123 |
| 2003/0095578 A1 * | 5/2003 | Kopp | | G02B 6/02085 372/6 |
| 2004/0086245 A1 * | 5/2004 | Farroni | | C03B 37/01217 385/123 |
| 2004/0208464 A1 * | 10/2004 | Po | | G02B 6/032 385/123 |
| 2005/0017156 A1 * | 1/2005 | Ehrmann | | B23K 26/032 250/216 |
| 2005/0191017 A1 * | 9/2005 | Croteau | | G02B 6/03605 385/123 |
| 2005/0265678 A1 * | 12/2005 | Manyam | | G02B 6/02033 385/127 |
| 2006/0054606 A1 * | 3/2006 | Amako | | B23K 26/0608 219/121.73 |
| 2006/0219673 A1 | 10/2006 | Varnham et al. | | |
| 2007/0104436 A1 * | 5/2007 | Li | | H01S 3/06708 385/125 |
| 2007/0104438 A1 * | 5/2007 | Varnham | | H01S 3/06708 385/126 |
| 2007/0147751 A1 * | 6/2007 | Fini | | G02B 6/02009 385/123 |
| 2007/0178674 A1 * | 8/2007 | Imai | | B23K 26/0604 438/487 |
| 2007/0195850 A1 * | 8/2007 | Schluter | | H01S 5/4025 372/50.124 |
| 2007/0251543 A1 * | 11/2007 | Singh | | G03F 7/70925 134/1 |
| 2008/0037604 A1 * | 2/2008 | Savage-Leuchs | | G02B 6/4296 372/44.01 |
| 2008/0181567 A1 * | 7/2008 | Bookbinder | | G02B 6/02366 385/127 |
| 2008/0231939 A1 * | 9/2008 | Gluckstad | | G02B 21/06 359/298 |
| 2009/0034059 A1 * | 2/2009 | Fini | | G02B 6/02023 359/341.3 |
| 2009/0059353 A1 * | 3/2009 | Fini | | G02B 6/02009 359/341.3 |
| 2009/0127477 A1 * | 5/2009 | Tanaka | | B23K 26/0738 250/492.22 |
| 2010/0163537 A1 * | 7/2010 | Furuta | | B23K 26/38 219/121.72 |
| 2010/0187409 A1 | 7/2010 | Cristiani et al. | | |
| 2010/0251437 A1 * | 9/2010 | Heyn | | B82Y 35/00 850/1 |
| 2011/0032602 A1 * | 2/2011 | Rothenberg | | G02B 6/02042 359/341.1 |

(56) References Cited

U.S. PATENT DOCUMENTS

| | | | |
|---|---|---|---|
| 2011/0058250 A1* | 3/2011 | Liu | G02B 6/14 359/341.3 |
| 2011/0163077 A1* | 7/2011 | Partlo | B23K 26/0732 219/121.66 |
| 2011/0297229 A1* | 12/2011 | Gu | G02B 6/4298 136/259 |
| 2012/0009511 A1 | 1/2012 | Dmitriev | |
| 2012/0082410 A1* | 4/2012 | Peng | G02B 6/02304 385/11 |
| 2012/0168411 A1* | 7/2012 | Farmer | G02B 19/0052 219/121.67 |
| 2012/0329974 A1* | 12/2012 | Inada | G02B 1/04 527/303 |
| 2013/0146569 A1* | 6/2013 | Woods | B23K 26/06 219/121.64 |
| 2013/0148925 A1* | 6/2013 | Muendel | G02B 6/32 385/27 |
| 2013/0202264 A1* | 8/2013 | Messerly | G02B 6/02 385/123 |
| 2013/0223792 A1* | 8/2013 | Huber | B23K 26/073 385/18 |
| 2013/0251324 A1* | 9/2013 | Fini | G02B 6/02009 385/124 |
| 2013/0343703 A1* | 12/2013 | Genier | G02B 6/32 385/33 |
| 2014/0205236 A1* | 7/2014 | Noguchi | G02B 6/2835 385/33 |
| 2014/0334788 A1* | 11/2014 | Fini | G02B 6/0283 427/163.2 |
| 2015/0316716 A1* | 11/2015 | Fini | G02B 6/02009 385/124 |
| 2015/0378184 A1* | 12/2015 | Tayebati | G02F 1/295 250/492.1 |
| 2016/0013607 A1* | 1/2016 | McComb | H01S 3/06704 372/6 |
| 2016/0116679 A1 | 4/2016 | Muendel et al. | |

FOREIGN PATENT DOCUMENTS

| | | |
|---|---|---|
| JP | H11287922 A | 10/1999 |
| JP | H11344636 A | 12/1999 |
| JP | 2005070608 A | 3/2005 |
| JP | 2016201558 A | 12/2016 |
| WO | 2012165389 A1 | 12/2012 |

OTHER PUBLICATIONS

CAILabs, Canuda, Application Note, 2015 (Year: 2015).*
CAILabs, Canuda, Application note, Flexible high-power laser beam shaping (Year: 2015).*
J. M. Daniel, J. S. Chan, J. W. Kim, M. Ibsen, J. Sahu, and W. A. Clarkson, "Novel Technique for Mode Selection in a Large-Mode-Area Fiber Laser," in Conference on Lasers and Electro-Optics 2010, OSA Technical Digest (CD) (Optical Society of America, 2010), paper CWC5 (Year: 2010).*
J. M. O. Daniel, J. S. P. Chan, J. W. Kim, J. K. Sahu, M. Ibsen, and W. A. Clarkson, "Novel technique for mode selection in a multimode fiber laser," Opt. Express 19, 12434-12439 (2011) (Year: 2011).*
Faidel et al., Improvement of selective laser melting by beam shaping and minimized thermally induced effects in optical systems, 9th International Conference on Photonic Technologies LANE 2016 (Year: 2016).*
John M. Fini, "Bend-compensated design of large-mode-area fibers," Opt. Lett. 31, 1963-1965 (2006) (Year: 2006).*
John M. Fini and Jeffrey W. Nicholson, "Bend compensated large-mode-area fibers: achieving robust single-modedness with transformation optics," Opt. Express 21, 19173-19179 (2013) (Year: 2013).*
John M. Fini, "Large mode area fibers with asymmetric bend compensation," Opt. Express 19, 21866-21873 (2011) (Year: 2011).*
Garcia et al., Fast adaptive laser shaping based on multiple laser incoherent combining, Proc. SPIE 10097, High-Power Laser Materials Processing: Applications, Diagnostics, and Systems VI, 1009705 (Feb. 22, 2017); doi: 10.1117/12.2250303 (Year: 2017).*
Huang et al., "All-fiber mode-group-selective photonic lantern using graded-index multimode fibers," Opt. Express 23, 224-234 (2015) (Year: 2015).*
Jain et al., "Multi-Element Fiber Technology for Space-Division Multiplexing Applications," Opt. Express 22, 3787-3796 (2014) (Year: 2014).*
Jin et al., "Mode Coupling Effects in Ring-Core Fibers for Space-Division Multiplexing Systems," in Journal of Lightwave Technology, vol. 34, No. 14, pp. 3365-3372, Jul. 15, 2016. doi: 10.1109/JLT.2016.2564991 (Year: 2016).*
King et al., Observation of keyhole-mode laser melting in laser powder-bed fusion additive manufacturing, Journal of Materials Processing Technology 214 (2014) 2915-2925 (Year: 2014).*
D. A. V. Kliner, "Novel, High-Brightness, Fibre Laser Platform for kW Materials Processing Applications," in 2015 European Conference on Lasers and Electro-Optics—European Quantum Electronics Conference, (Optical Society of America, 2015), paper CJ_11_2. (Year: 2015).*
Kliner D.A.V., Bambha R.P., Do B.T., Farrow R.L., Feve J.-P., Fox B.P., Hadley G.R., Wien G., Overview of Sandia's fiber laser program (2008) Proceedings of SPIE—The International Society for Optical Engineering, 6952, art. No. 695202 (Year: 2008).*
Koplow et al., "Single-mode operation of a coiled multimode fiber amplifier," Opt. Lett. 25, 442-444 (2000) (Year: 2000).*
Laskin, Applying of refractive spatial beam shapers with scanning optics ICALEO, 941-947 (2011) (Year: 2011).*
Longhi et al., Self-focusing and nonlinear periodic beams in parabolic index optical fibres, Published May 4, 2004 o IOP Publishing Ltd Journal of Optics B: Quantum and Semiclassical Optics, vol. 6, No. 5 (Year: 2004).*
Mumtaz et al., Selective Laser Melting of thin wall parts using pulse shaping, Journal of Materials Processing Technology 210 (2010) 279-287 (Year: 2010).*
Putsch et al., Active optical system for laser structuring of 3D surfaces by remelting, Proc. SPIE 8843, Laser Beam Shaping XIV, 88430D (Sep. 28, 2013); doi: 10.1117/12.2023306 https://www.osapublishing.org/conference.cfm?meetingid=90&yr=2015 (Year: 2013).*
Sandia National Laboratories—Brochure (POC—D.A.V. Kliner); "Mode-Filtered Fiber Amplifier," 2007 (Year: 2007).*
SeGall et al., "Simultaneous laser mode conversion and beam combining using multiplexed volume phase elements," in Advanced Solid-State Lasers Congress, G. Huber and P. Moulton, eds., OSA Technical Digest (online) (Optical Society of America, 2013), paper AW2A.9. (Year: 2013).*
Thiel et al., Reliable Beam Positioning for Metal-based Additive Manufacturing by Means of Focal Shift Reduction, Lasers in Manufacturing Conference 2015. (Year: 2015).*
Wischeropp et al., Simulation of the effect of different laser beam intensity profiles on heat distribution in selective laser melting, Lasers in Manufacturing Conference 2015. (Year: 2015).*
Xiao et al., "Fiber coupler for mode selection and high-efficiency pump coupling," Opt. Lett. 38, 1170-1172 (2013) (Year: 2013).*
Ye et al., Mold-free fs laser shock micro forming and its plastic deformation mechanism, Optics and Lasers in Engineering 67 (2015) 74-82. (Year: 2015).*
Yu et al., Laser material processing based on non-conventional beam focusing strategies, 9th International Conference on Photonic Technologies LANE 2016 (Year: 2016).*
Zhirnov et al., Laser beam profiling: experimental study of its influence on single-track formation by selective laser melting, Mechanics & Industry 16, 709 (2015) (Year: 2015).*
Decombe et al., Single and dual fiber nano-tip optical tweezers: trapping and analysis, Opt. Express 21, 30521-30531 (2013) (Year: 2013).*
Jollivet, Clemence, Specialty Fiber Lasers and Novel Fiber Devices, Doctoral Dissertation, University of Central Florida, 2014 (Year: 2014).*
Jollivet et al., Advances in Multi-Core Fiber Lasers, Invited Presentation, DOI: 10.1364/LAOP.2014.LM1D.3.,2014 (Year: 2014).*

(56) References Cited

OTHER PUBLICATIONS

Kosolapov et al., Hollow-core revolver fibre with a double-capillary reflective cladding, Quantum Electron. 46 267 (Year: 2016).*

Messerly, et al., Field-flattened, ring-like propagation modes, Optics Express, V. 21, N. 10, p. 12683 (Year: 2013).*

Messerly et al., Patterned flattened modes, Optics Letters, V. 38, N. 17, p. 3329 (Year: 2013).*

Salceda-Delgado et al., Compact fiber-optic curvature sensor based on super-mode interference in a seven-core fiber, Optics Letters, V. 40, N. 7, p. 1468, (Year: 2015).*

Birks et al., The photonic lantern, Advances in Optics and Photonics 7, 107-167 (2015) (Year: 2015).*

Van Newkirk et al., Bending sensor combining multicore fiber with a mode-selective photonic lantern, Opt. Lett. 40, 5188-5191 (2015) (Year: 2015).*

Zhang et al., Switchable multiwavelength fiber laser by using a compact in-fiber Mach-Zehnder interferometer, J. Opt. 14 (2012 (045403) (Year: 2012).*

Rocha, Ana. (2009). Modeling of Bend Losses in Single-Mode Optical Fibers. Conference: 7th Conference on Telecommunications—Conftele 2009 7th Conference on Telecommunications—Conftele 2009 (Year: 2009).*

Ivanov et al., Fiber-Optic Bend Sensor Based on Double Cladding Fiber, Journal of Sensors, vol. 2015, Article ID 726793. (Year: 2015).*

Oleg V Ivanov and Ivan V Zlodeev, Fiber structure based on a depressed inner cladding fiber for bend, refractive index and temperature sensing, 2014 Meas. Sci. Technol. 25 015201 (Year: 2014).*

I.V. Zlodeev and O.V. Ivanov, Transmission spectra of a double-clad fibre structure under bending, Quantum Electronics 43 (6) 535-541 (2013) (Year: 2013).*

Tam et al., An imaging fiber-based optical tweezer array for microparticle array assembly, Appl. Phys. Lett. 84, 4289 (2004); https://doi.org/10.1063/1.1753062 (Year: 2004).*

Drobczynski et al., "Real-time force measurement in double wavelength optical tweezers", Journal of the Optical Society of America B, vol. 34, No. 1, Jan. 2017, 6 pages.

Hester et al., "Tunable optical tweezers for wavelength-dependent measurements", Review of Scientific Instruments, vol. 83, Apr. 23, 2012, 8 pages.

Barron, et al., "Dual-beam interference from a lensed multicore fiber and its application to optical trapping", Optics Express, vol. 20, No. 21, Oct. 8, 2012, 6 pages.

Anastasiadi, et al., "Fabrication and characterization of machined multi-core fiber tweezers for single cell manipulation", Optics Express, vol. 26, No. 3, Feb. 5, 2018, 11 pages.

Barron, et al., "Optical Trapping using a Lensed Multicore Fiber", Workshop on Specialty Optical Fibers and their Applications, 2013, 2 pages.

"Optical Tweezers & Micromanipulation: Applications | Hamamatsu Phototonics", Available at: http://www.hamamatsu.com/jp/en/community/lcos/aplications/optical.html, Archived: Mar. 27, 2015, 3 pages.

International Search Report and Written Opinion for International Application No. PCT/US2018/023963, dated Aug. 9, 2018, 7 pages.

\* cited by examiner

MULTICORE FIBER-COUPLED OPTICAL PROBING TECHNIQUES

RELATED APPLICATIONS

This application is a continuation-in-part of each of the following applications filed May 26, 2017: U.S. patent application Ser. Nos. 15/607,399; 15/607,410; and 15/607,411; and International Application No. PCT/US2017/034848. Each of these applications claims benefit of U.S. Provisional Patent Application No. 62/401,650, filed Sep. 29, 2016. All of these applications are incorporated by reference herein in their entireties.

TECHNICAL FIELD

The technology disclosed herein relates to optical trapping. More particularly, the disclosed technology relates to methods, apparatus, and systems for on-the-fly manipulation of distributions of light that selectively travels through different cores of an all fiber-coupled optical probe (or so-called tweezer) device that need not possess free-space optics.

BACKGROUND

Optical trapping provides a tool for the manipulation of small objects between nanometer and micrometer scales. By trapping or moving the small objects, such tools are capable of, e.g., applying measurable forces to dielectric particles. In other experiments, optical forces are applied to a polystyrene microsphere bead attached to a protein of interest. The microsphere is trappable and provides a convenient handle to manipulate the protein so as to make quantitative measurements of mechanical properties in connection with the spatial manipulation of biological polymers as well as the force generation mechanisms of molecular motors.

Recently, attempts at using a multicore fibers (MCF) for optical trapping have been made. An MCF typically has several cores surrounded in one buffer coating, and independent beams can be transmitted through each of the cores. Attempts to employ MCF for optical trapping have entailed micromachining (e.g., mirror milling and lens shaping) techniques for modifying ends of the cores to enable them to emit beams establishing an optical trap. Absent free space optics, however, such beams from a single fiber-coupled laser source are not movable relative to each other. Furthermore, separate (expensive) laser sources may provide separate beams, but these are difficult to set-up and properly align and there are problems such as optical loss and diffraction stemming from such techniques.

Similarly, currently available laser systems capable of varying beam characteristics use free-space optics or other complex and expensive add-on mechanisms (e.g., zoom lenses, mirrors, translatable or motorized lenses, combiners, etc.) in order to vary beam characteristics. No solution exists that provides the desired adjustability in beam characteristics (i.e., spatial distribution) that minimizes or eliminates reliance on the use of free-space optics or other extra components that add significant penalties in terms of cost, complexity, performance, and/or reliability. What is needed is an in-fiber apparatus for providing varying beam characteristics so as to manipulate distributions of light selected to travel through one or more selectable cores of an MCF-coupled optical probe device.

SUMMARY

Disclosed are techniques to trap reactive particles at different locations, move optical trap locations relative to each other, the ability to trap multiple particles, or otherwise change trapping properties in a way that needs not entail a change of laser sources, objectives, or environmental conditions.

Disclosed is an optical beam delivery device configured to establish, from an optical beam, an optical trap that is moveable to different optical trap locations. The device has a first length of fiber through which the optical beam propagates along a propagation path and which has a first refractive index profile (RIP) (e.g., a parabolic region). The first RIP enables, in response to an applied perturbation, modification of the propagation path to form an adjusted optical beam movable to propagate along different propagation paths in response to different states of the applied perturbation. The device also has a second length of fiber coupled to the first length of fiber and having multiple spaced-apart, non-coaxial confinement cores defining a second RIP. The confinement cores occupy different positions in, and correspond to the different optical trap locations at an output of, the second length of fiber. In response to a selected state of the different states of applied perturbation, at least a portion of the adjusted optical beam is directed to a position of a selected corresponding one of the confinement cores providing at the output of the second length of fiber a corresponding one of the different optical trap locations.

In some embodiments, the different optical trap locations correspond to first and second optical trap locations and the optical beam is a multi-wavelength optical beam having first and second wavelengths for direction to, respectively, first and second confinement cores corresponding to the first and second optical trap locations. Accordingly, the second optical trap location is moveable relative to the first optical trap location in response to the different states of the applied perturbation, according to certain embodiments.

In yet other embodiments, the confinement cores include mutually azimuthally spaced-apart confinement cores, linearly spaced-apart confinement cores, or both.

In still further embodiments, different pairs of cores from among the confinement cores are selectable to receive two spaced-apart portions of the adjusted optical beam for producing two spaced-apart optical traps. In another embodiment, at least one core of a selected pair of the different pairs of cores is moveable relative to the other core of the selected pair.

In yet another embodiment, a first one of the confinement cores has a first numerical aperture (NA) and a second one of the confinement cores has a second NA that is different from the first NA.

In a still further embodiment, the device includes a multi-wavelength laser source, a perturbation device, or both. The perturbation device may include an actuator and a controller to control in two or more axes the selected state of the different states of applied perturbation. In some embodiments, the perturbation device imparts at selected radial locations a bend to one or both of the first and second lengths of fiber. The different states of the applied perturbation may be different radii of bend or different directions of bend.

In another embodiment, a set of cores is provided, in which one or more members of the set provide different trapping properties than other members of the set.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings.

DETAILED DESCRIPTION

Figure 1:
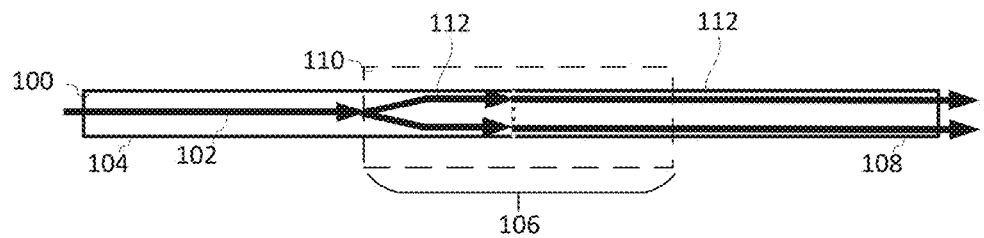
FIG. 1 illustrates an example fiber structure for providing a laser beam having variable beam characteristics.

As used herein throughout this disclosure and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. Also, the terms "modify" and "adjust" are used interchangeably to mean "alter."

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest," "best," "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

Definitions

Definitions of words and terms as used herein:
1. The term "beam characteristics" refers to one or more of the following terms used to describe an optical beam. In general, the beam characteristics of most interest depend on the specifics of the application or optical system.
2. The term "beam diameter" is defined as the distance across the center of the beam along an axis for which the irradiance (intensity) equals $1/e^2$ of the maximum irradiance. While examples disclosed herein generally use beams that propagate in azimuthally symmetric modes, elliptical or other beam shapes can be used, and beam diameter can be different along different axes. Circular beams are characterized by a single beam diameter. Other beam shapes can have different beam diameters along different axes.
3. The term "spot size" is the radial distance (radius) from the center point of maximum irradiance to the $1/e^2$ point.

4. The term "beam divergence distribution" is the power vs the full cone angle. This quantity is sometimes called the "angular distribution" or "NA distribution."
5. The term "beam parameter product" (BPP) of a laser beam is defined as the product of the beam radius (measured at the beam waist) and the beam divergence half-angle (measured in the far field). The units of BPP are typically mm-mrad.
6. A "confinement fiber" is defined to be a fiber that possesses one or more confinement regions, wherein a confinement region comprises a higher-index region (core region) surrounded by a lower-index region (cladding region). The RIP of a confinement fiber may include one or more higher-index regions (core regions) surrounded by lower-index regions (cladding regions), wherein light is guided in the higher-index regions. Each confinement region and each cladding region can have any RIP, including but not limited to step-index and graded-index. The confinement regions may or may not be concentric and may be a variety of shapes such as circular, annular, polygonal, arcuate, elliptical, or irregular, or the like or any combination thereof. The confinement regions in a particular confinement fiber may all have the same shape or may be different shapes. Moreover, confinement regions may be co-axial or may have offset axes with respect to one another. Confinement regions may be of uniform thickness about a central axis in the longitudinal direction, or the thicknesses may vary about the central axis in the longitudinal direction.
7. The term "intensity distribution" refers to optical intensity as a function of position along a line (1D profile) or on a plane (2D profile). The line or plane is usually taken perpendicular to the propagation direction of the light. It is a quantitative property.
8. "Luminance" is a photometric measure of the luminous intensity per unit area of light travelling in a given direction.
9. "$M^2$ factor" (also called "beam quality factor" or "beam propagation factor") is a dimensionless parameter for quantifying the beam quality of laser beams, with $M^2=1$ being a diffraction-limited beam, and larger $M^2$ values corresponding to lower beam quality. $M^2$ is equal to the BPP divided by $\lambda/\pi$, where $\lambda$ is the wavelength of the beam in microns (if BPP is expressed in units of mm-mrad).
10. The term "numerical aperture" or "NA" of an optical system is a dimensionless number that characterizes the range of angles over which the system can accept or emit light.
11. The term "optical intensity" is not an official (SI) unit, but is used to denote incident power per unit area on a surface or passing through a plane.
12. The term "power density" refers to optical power per unit area, although this is also referred to as "optical intensity."
13. The term "radial beam position" refers to the position of a beam in a fiber measured with respect to the center of the fiber core in a direction perpendicular to the fiber axis.
14. "Radiance" is the radiation emitted per unit solid angle in a given direction by a unit area of an optical source (e.g., a laser). Radiance may be altered by changing the beam intensity distribution and/or beam divergence profile or distribution. The ability to vary the radiance profile of a laser beam implies the ability to vary the BPP.
15. The term "refractive-index profile" or "RIP" refers to the refractive index as a function of position along a line (1D) or in a plane (2D) perpendicular to the fiber axis. Many fibers are azimuthally symmetric, in which case the 1D RIP is identical for any azimuthal angle.
16. A "step-index fiber" has a RIP that is flat (refractive index independent of position) within the fiber core.
17. A "graded-index fiber" has a RIP in which the refractive index decreases with increasing radial position (i.e., with increasing distance from the center of the fiber core).
18. A "parabolic-index fiber" is a specific case of a graded-index fiber in which the refractive index decreases quadratically with increasing distance from the center of the fiber core.

Fiber for Varying Beam Characteristics

Disclosed herein are methods, systems, and apparatus configured to provide a fiber operable to provide a laser beam having variable beam characteristics (VBC) that may reduce cost, complexity, optical loss, or other drawbacks of the conventional methods described above. This VBC fiber is configured to vary a wide variety of optical beam characteristics. Such beam characteristics can be controlled using the VBC fiber thus allowing users to tune various beam characteristics to suit the particular requirements of an extensive variety of laser processing applications. For example, a VBC fiber may be used to tune beam diameter, beam divergence distribution, BPP, intensity distribution, $M^2$ factor, NA, optical intensity, power density, radial beam position, radiance, spot size, or the like, or any combination thereof.

In general, the disclosed technology entails coupling a laser beam into a fiber in which the characteristics of the laser beam in the fiber can be adjusted by perturbing the laser beam and/or perturbing a first length of fiber by any of a variety of methods (e.g., bending the fiber or introducing one or more other perturbations) and fully or partially maintaining adjusted beam characteristics in a second length of fiber. The second length of fiber is specially configured to maintain and/or further modify the adjusted beam characteristics. In some cases, the second length of fiber preserves the adjusted beam characteristics through delivery of the laser beam to its ultimate use (e.g., materials processing). The first and second lengths of fiber may comprise the same or different fibers.

The disclosed technology is compatible with fiber lasers and fiber-coupled lasers. Fiber-coupled lasers typically deliver an output via a delivery fiber having a step-index refractive index profile (RIP), i.e., a flat or constant refractive index within the fiber core. In reality, the RIP of the delivery fiber may not be perfectly flat, depending on the design of the fiber. Important parameters are the fiber core diameter ($d_{core}$) and NA. The core diameter is typically in the range of 10-1000 microns (although other values are possible), and the NA is typically in the range of 0.06-0.22 (although other values are possible). A delivery fiber from the laser may be routed directly to the process head or workpiece, or it may be routed to a fiber-to-fiber coupler (FFC) or fiber-to-fiber switch (FFS), which couples the light from the delivery fiber into a process fiber that transmits the beam to the process head or the workpiece.

Most materials processing tools, especially those at high power (>1 kW), employ multimode (MM) fiber, but some employ single-mode (SM) fiber, which is at the lower end of the $d_{core}$ and NA ranges. The beam characteristics from a SM fiber are uniquely determined by the fiber parameters. The beam characteristics from a MM fiber, however, can vary (unit-to-unit and/or as a function of laser power and time), depending on the beam characteristics from the laser source(s) coupled into the fiber, the launching or splicing conditions into the fiber, the fiber RIP, and the static and dynamic geometry of the fiber (bending, coiling, motion, microbending, etc.). For both SM and MM delivery fibers, the beam characteristics may not be optimum for a given materials processing task, and it is unlikely to be optimum for a range of tasks, motivating the desire to be able to systematically vary the beam characteristics in order to customize or optimize them for a particular processing task.

In one example, the VBC fiber may have a first length and a second length and may be configured to be interposed as an in-fiber device between the delivery fiber and the process head to provide the desired adjustability of the beam characteristics. To enable adjustment of the beam, a perturbation device and/or assembly is disposed in close proximity to and/or coupled with the VBC fiber and is responsible for perturbing the beam in a first length such that the beam's characteristics are altered in the first length of fiber, and the altered characteristics are preserved or further altered as the beam propagates in the second length of fiber. The perturbed beam is launched into a second length of the VBC fiber configured to conserve adjusted beam characteristics. The first and second lengths of fiber may be the same or different fibers and/or the second length of fiber may comprise a confinement fiber. The beam characteristics that are conserved by the second length of VBC fiber may include any of: beam diameter, beam divergence distribution, BPP, intensity distribution, luminance, $M^2$ factor, NA, optical intensity, power density, radial beam position, radiance, spot size, or the like, or any combination thereof.

FIG. 1 illustrates an example VBC fiber 100 for providing a laser beam having variable beam characteristics without requiring the use of free-space optics to change the beam characteristics. VBC fiber 100 comprises a first length of fiber 104 and a second length of fiber 108. First length of fiber 104 and second length of fiber 108 may be the same or different fibers and may have the same or different RIPs. The first length of fiber 104 and the second length of fiber 108 may be joined together by a splice. First length of fiber 104 and second length of fiber 108 may be coupled in other ways, may be spaced apart, or may be connected via an interposing component such as another length of fiber, free-space optics, glue, index-matching material, or the like or any combination thereof.

A perturbation device 110 is disposed proximal to and/or envelops a perturbation region 106. Perturbation device 110 may be a device, assembly, in-fiber structure, and/or other feature. Perturbation device 110 at least perturbs optical beam 102 in first length of fiber 104 or second length of fiber 108 or a combination thereof in order to adjust one or more beam characteristics of optical beam 102. Adjustment of beam 102 responsive to perturbation by perturbation device 110 may occur in first length of fiber 104 or second length of fiber 108 or a combination thereof. Perturbation region 106 may extend over various widths and may or may not extend into a portion of second length of fiber 108. As beam 102 propagates in VBC fiber 100, perturbation device 110 may physically act on VBC fiber 100 to perturb the fiber and adjust the characteristics of beam 102. Alternatively, perturbation device 110 may act directly on beam 102 to alter its beam characteristics. Subsequent to being adjusted, perturbed beam 112 has different beam characteristics from those of beam 102, which will be fully or partially conserved in second length of fiber 108. In another example, perturbation device 110 need not be disposed near a splice. Moreover, a splice may not be needed at all, for example VBC fiber 100 may be a single fiber, first length of fiber and second length of fiber could be spaced apart, or secured with a small gap (air-spaced or filled with an optical material, such as optical cement or an index-matching material).

Perturbed beam 112 is launched into second length of fiber 108, where perturbed beam 112 characteristics are largely maintained or continue to evolve as perturbed beam 112 propagates yielding the adjusted beam characteristics at the output of second length of fiber 108. In one example, the new beam characteristics may include an adjusted intensity distribution. In an example, an altered beam intensity distribution will be conserved in various structurally bounded confinement regions of second length of fiber 108. Thus, the beam intensity distribution may be tuned to a desired beam intensity distribution optimized for a particular laser processing task. In general, the intensity distribution of perturbed beam 112 will evolve as it propagates in the second length of fiber 108 to fill the confinement region(s) into which perturbed beam 112 is launched responsive to conditions in first length of fiber 104 and perturbation caused by perturbation device 110. In addition, the angular distribution may evolve as the beam propagates in the second fiber, depending on launch conditions and fiber characteristics. In general, fibers largely preserve the input divergence distribution, but the distribution can be broadened if the input divergence distribution is narrow and/or if the fiber has irregularities or deliberate features that perturb the divergence distribution. The various confinement regions, perturbations, and fiber features of second length of fiber 108 are described in greater detail below. Beams 102 and 112 are conceptual abstractions intended to illustrate how a beam may propagate through a VBC fiber 100 for providing variable beam characteristics and are not intended to closely model the behavior of a particular optical beam.

VBC fiber 100 may be manufactured by a variety of methods including PCVD (Plasma Chemical Vapor Deposition), OVD (Outside Vapor Deposition), VAD (Vapor Axial Deposition), MOCVD (Metal-Organic Chemical Vapor Deposition.) and/or DND (Direct Nanoparticle Deposition). VBC fiber 100 may comprise a variety of materials. For example, VBC fiber 100 may comprise $SiO_2$, $SiO_2$ doped with $GeO_2$, germanosilicate, phosphorus pentoxide, phosphosilicate, $Al_2O_3$, aluminosilicate, or the like or any combinations thereof. Confinement regions may be bounded by cladding doped with fluorine, boron, or the like or any combinations thereof. Other dopants may be added to active fibers, including rare-earth ions such as $Er^{3+}$ (erbium), $Yb^{3+}$ (ytterbium), $Nd^{3+}$ (neodymium), $Tm^{3+}$ (thulium), $Ho^{3+}$ (holmium), or the like or any combination thereof. Confinement regions may be bounded by cladding having a lower index than that of the confinement region with fluorine or boron doping. Alternatively, VBC fiber 100 may comprise photonic crystal fibers or micro-structured fibers.

VBC fiber 100 is suitable for use in any of a variety of fiber, fiber optic, or fiber laser devices, including continuous wave and pulsed fiber lasers, disk lasers, solid state lasers, or diode lasers (pulse rate unlimited except by physical constraints). Furthermore, implementations in a planar waveguide or other types of waveguides and not just fibers are within the scope of the claimed technology.

Figure 2:
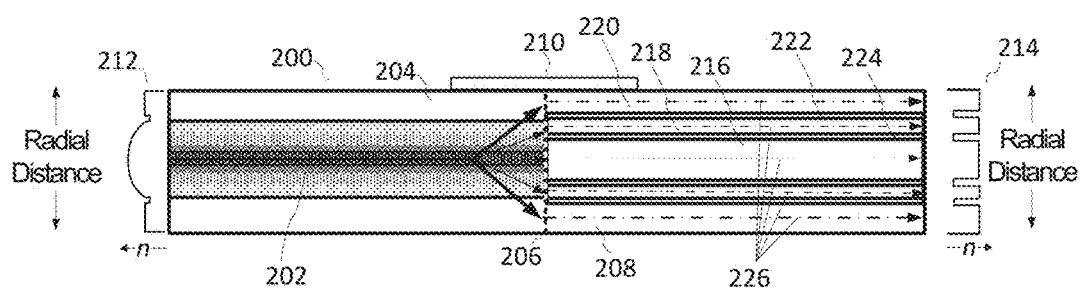
FIG. 2 depicts a cross-sectional view of an example fiber structure for delivering a beam with variable beam characteristics.

FIG. 2 depicts a cross-sectional view of an example VBC fiber 200 for adjusting beam characteristics of an optical beam. In an example, VBC fiber 200 may be a process fiber because it may deliver the beam to a process head for material processing. VBC fiber 200 comprises a first length of fiber 204 spliced at a junction 206 to a second length of fiber 208. A perturbation assembly 210 is disposed proximal to junction 206. Perturbation assembly 210 may be any of a variety of devices configured to enable adjustment of the beam characteristics of an optical beam 202 propagating in VBC fiber 200. In an example, perturbation assembly 210 may be a mandrel and/or another device that may provide means of varying the bend radius and/or bend length of VBC fiber 200 near the splice. Other examples of perturbation devices are discussed below with respect to FIG. 24.

In an example, first length of fiber 204 has a parabolic-index RIP 212 as indicated by the left RIP graph. Most of the intensity distribution of beam 202 is concentrated in the center of fiber 204 when fiber 204 is straight or nearly straight. Second length of fiber 208 is a confinement fiber having RIP 214 as shown in the right RIP graph. Second length of fiber 208 includes confinement regions 216, 218, and 220. Confinement region 216 is a central core surrounded by two annular (or ring-shaped) confinement regions 218 and 220. Layers 222 and 224 are structural barriers of lower index material between confinement regions (216, 218 and 220), commonly referred to as "cladding" regions. In one example, layers 222 and 224 may comprise rings of fluorosilicate; in some embodiments, the fluorosilicate cladding layers are relatively thin. Other materials may be used as well, and claimed subject matter is not limited in this regard.

In an example, as beam 202 propagates along VBC fiber 200, perturbation assembly 210 may physically act on fiber 204 and/or beam 202 to adjust its beam characteristics and generate an adjusted beam 226. In the current example, the intensity distribution of beam 202 is modified by perturbation assembly 210. Subsequent to adjustment of beam 202, the intensity distribution of adjusted beam 226 may be concentrated in outer confinement regions 218 and 220 with relatively little intensity in the central confinement region 216. Because each of confinement regions 216, 218, and/or 220 is isolated by the thin layers of lower index material in barrier layers 222 and 224, second length of fiber 208 can substantially maintain the adjusted intensity distribution of adjusted beam 226. The beam will typically become distributed azimuthally within a given confinement region but will not transition (significantly) between the confinement regions as it propagates along the second length of fiber 208. Thus, the adjusted beam characteristics of adjusted beam 226 are largely conserved within the isolated confinement regions 216, 218, and/or 220. In some cases, it be may desirable to have the beam 226 power divided among the confinement regions 216, 218, and/or 220 rather than concentrated in a single region, and this condition may be achieved by generating an appropriately adjusted beam 226.

In one example, core confinement region 216 and annular confinement regions 218 and 220 may be composed of fused silica glass, and cladding 222 and 224 defining the confinement regions may be composed of fluorosilicate glass. Other materials may be used to form the various confinement regions (216, 218 and 220), including germanosilicate, phosphosilicate, aluminosilicate, or the like, or a combination thereof and claimed subject matter is not so limited. Other materials may be used to form the barrier rings (222 and 224), including fused silica, borosilicate, or the like or a combination thereof, and claimed subject matter is not so limited. In other embodiments, the optical fibers or waveguides include or are composed of various polymers or plastics or crystalline materials. Generally, the core confinement regions have refractive indices that are greater than the refractive indices of adjacent barrier/cladding regions.

In some examples, it may be desirable to increase a number of confinement regions in a second length of fiber to increase granularity of beam control over beam displacements for fine-tuning a beam profile. For example, confinement regions may be configured to provide stepwise beam displacement.

Figure 3:
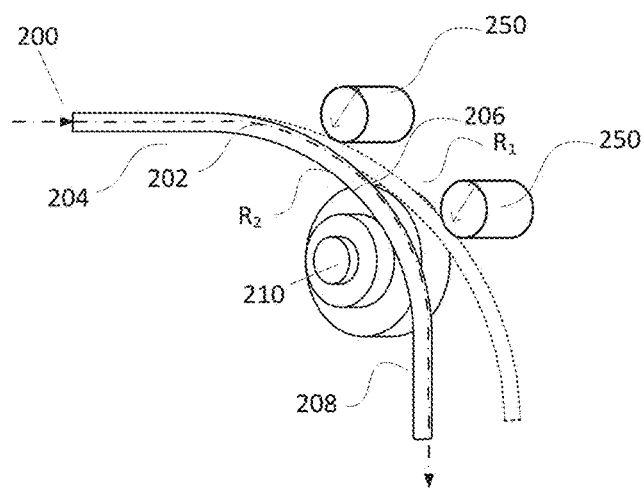
FIG. 3 illustrates an example method of perturbing a fiber structure for providing a beam having variable beam characteristics.

FIG. 3 illustrates an example method of perturbing fiber 200 for providing variable beam characteristics of an optical beam. Changing the bend radius of a fiber may change the radial beam position, divergence angle, and/or radiance profile of a beam within the fiber. The bend radius of VBC fiber 200 can be decreased from a first bend radius $R_1$ to a second bend radius $R_2$ about splice junction 206 by using a stepped mandrel or cone as the perturbation assembly 210. Additionally or alternatively, the engagement length on the mandrel(s) or cone can be varied. Rollers 250 may be employed to engage VBC fiber 200 across perturbation assembly 210. In an example, an amount of engagement of rollers 250 with fiber 200 has been shown to shift the distribution of the intensity profile to the outer confinement regions 218 and 220 of fiber 200 with a fixed mandrel radius. There are a variety of other methods for varying the bend radius of fiber 200, such as using a clamping assembly, flexible tubing, or the like, or a combination thereof, and claimed subject matter is not limited in this regard. In another example, for a particular bend radius the length over which VBC fiber 200 is bent can also vary beam characteristics in a controlled and reproducible way. In examples, changing the bend radius and/or length over which the fiber is bent at a particular bend radius also modifies the intensity distribution of the beam such that one or more modes may be shifted radially away from the center of a fiber core.

Maintaining the bend radius of the fibers across junction 206 ensures that the adjusted beam characteristics such as radial beam position and radiance profile of optical beam 202 will not return to its unperturbed state before being launched into second length of fiber 208. Moreover, the adjusted radial beam characteristics, including position, divergence angle, and/or intensity distribution, of adjusted beam 226 can be varied based on an extent of decrease in the bend radius and/or the extent of the bent length of VBC fiber 200. Thus, specific beam characteristics may be obtained using this method.

In the current example, first length of fiber 204 having first RIP 212 is spliced at junction 206 to a second length of fiber 208 having a second RIP 214. However, it is possible to use a single fiber having a single RIP formed to enable perturbation (e.g., by micro-bending) of the beam characteristics of beam 202 and to enable conservation of the adjusted beam. Such a RIP may be similar to the RIPs shown in fibers illustrated in FIGS. 17, 18, and/or 19.

Figure 4:
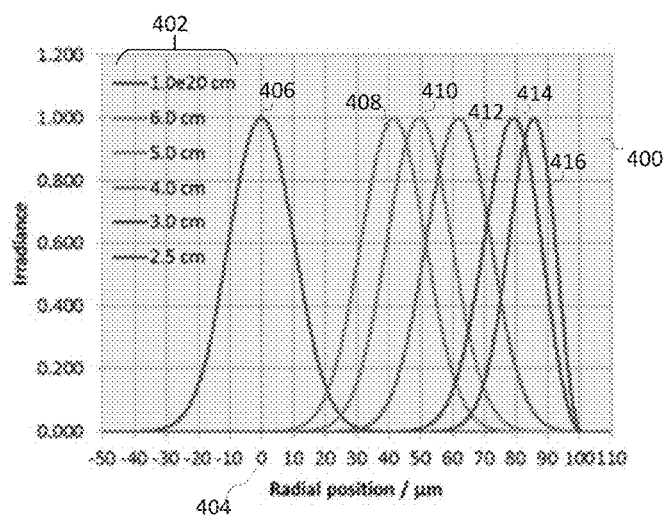
FIG. 4 is a graph illustrating the calculated spatial profile of the lowest-order mode ($LP_{01}$) for a first length of a fiber for different fiber bend radii.
Figure 5:
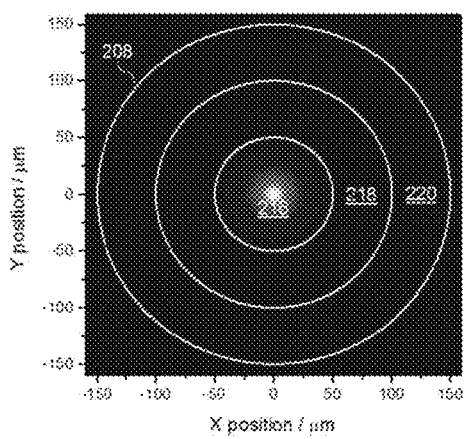
FIG. 5 illustrates an example of a two-dimensional intensity distribution at a junction when a fiber for varying beam characteristics is nearly straight.
Figure 6:
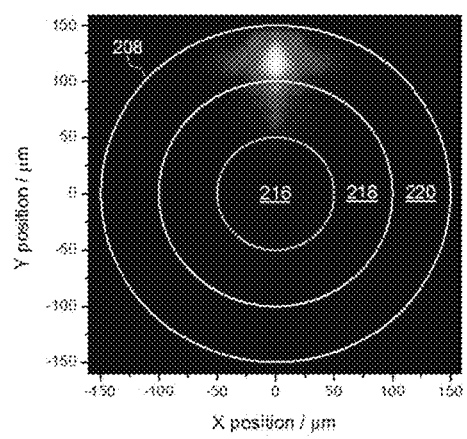
FIG. 6 illustrates an example of a two-dimensional intensity distribution at a junction when a fiber for varying beam characteristics is bent with a radius chosen to preferentially excite a particular confinement region of a second length of fiber.

FIGS. 7-10 provide experimental results for VBC fiber 200 (shown in FIGS. 2 and 3) and illustrate further a beam response to perturbation of VBC fiber 200 when a perturbation assembly 210 acts on VBC fiber 200 to bend the fiber. FIGS. 4-6 are simulations and FIGS. 7-10 are experimental results wherein a beam from a SM 1050 nm source was launched into an input fiber (not shown) with a 40 micron core diameter. The input fiber was spliced to first length of fiber 204.

FIG. 4 is an example graph 400 illustrating the calculated profile of the lowest-order mode ($LP_{01}$) for a first length of fiber 204 for different fiber bend radii 402, wherein a perturbation assembly 210 involves bending VBC fiber 200. As the fiber bend radius is decreased, an optical beam propagating in VBC fiber 200 is adjusted such that the mode shifts radially away from the center 404 of a VBC fiber 200 core (r=0 micron) toward the core/cladding interface (located at r=100 micron in this example). Higher-order modes ($LP_{ln}$) also shift with bending. Thus, for a straight or nearly straight fiber (very large bend radius), curve 406 for $LP_{01}$ is centered at or near the center of VBC fiber 200. At a bend radius of about 6 cm, curve 408 for $LP_{01}$ is shifted to a radial position of about 40 μm from the center 406 of VBC fiber 200. At a bend radius of about 5 cm, curve 410 for $LP_{01}$ is shifted to a radial position about 50 μm from the center 406 of VBC fiber 200. At a bend radius of about 4 cm, curve 412 for $LP_{01}$ is shifted to a radial position about 60 μm from the center 406 of VBC fiber 200. At a bend radius of about 3 cm, curve 414 for $LP_{01}$ is shifted to a radial position about 80 μm from the center 406 of VBC fiber 200. At a bend radius of about 2.5 cm, a curve 416 for $LP_{01}$ is shifted to a radial position about 85 μm from the center 406 of VBC fiber 200. Note that the shape of the mode remains relatively constant (until it approaches the edge of the core), which is a specific property of a parabolic RIP. Although, this property may be desirable in some situations, it is not required for the VBC functionality, and other RIPs may be employed.

In an example, if VBC fiber 200 is straightened, $LP_{01}$ mode will shift back toward the center of the fiber. Thus, the purpose of second length of fiber 208 is to "trap" or confine the adjusted intensity distribution of the beam in a confinement region that is displaced from the center of the VBC fiber 200. The splice between fibers 204 and 208 is included in the bent region, thus the shifted mode profile will be preferentially launched into one of the ring-shaped confinement regions 218 and 220 or be distributed among the confinement regions. FIGS. 5 and 6 illustrate this effect.

FIG. 5 illustrates an example of two-dimensional intensity distribution at junction 206 within second length of fiber 208 when VBC fiber 200 is nearly straight. A significant portion of $LP_{01}$ and $LP_{In}$, is within confinement region 216 of fiber 208. FIG. 6 illustrates the two-dimensional intensity distribution at junction 206 within second length of fiber 208 when VBC fiber 200 is bent with a radius chosen to preferentially excite confinement region 220 (the outermost confinement region) of second length of fiber 208. A significant portion of $LP_{01}$ and $LP_{In}$, is within confinement region 220 of fiber 208.

In an example, in second length of fiber 208, confinement region 216 has a 100 micron diameter, confinement region 218 is between 120 micron and 200 micron in diameter, and confinement region 220 is between 220 micron and 300 micron diameter. Confinement regions 216, 218, and 220 are separated by 10 μm thick rings of fluorosilicate, providing an NA of 0.22 for the confinement regions. Other inner and outer diameters for the confinement regions, thicknesses of the rings separating the confinement regions, NA values for the confinement regions, and numbers of confinement regions may be employed.

Referring again to FIG. 5, with the noted parameters, when VBC fiber 200 is straight, about 90% of the power is contained within the central confinement region 216, and about 100% of the power is contained within confinement regions 216 and 218. Referring now to FIG. 6, when fiber 200 is bent to preferentially excite second ring confinement region 220, nearly 75% of the power is contained within confinement region 220, and more than 95% of the power is contained within confinement regions 218 and 220. These calculations include $LP_{01}$ and two higher-order modes, which are typical in some 2-4 kW fiber lasers.

It is clear from FIGS. 5 and 6 that, in the case where a perturbation assembly 210 acts on VBC fiber 200 to bend the fiber, the bend radius determines the spatial overlap of the modal intensity distribution of the first length of fiber 204 with the different guiding confinement regions (216, 218, and 220) of the second length of fiber 208. Changing the bend radius can thus change the intensity distribution at the output of the second length of fiber 208, thereby changing the diameter or spot size of the beam, and thus changing its radiance and BPP value. This adjustment of the spot size may be accomplished in an all-fiber structure, involving no free-space optics and consequently may reduce or eliminate the disadvantages of free-space optics discussed above. Such adjustments can also be made with other perturbation assemblies that alter bend radius, bend length, fiber tension, temperature, or other perturbations discussed below.

In a typical materials processing system (e.g., a cutting or welding tool), the output of the process fiber is imaged at or near the workpiece by the process head. Varying the intensity distribution as shown in FIGS. 5 and 6 thus enables variation of the beam profile at the workpiece in order to tune and/or optimize the process, as desired. Specific RIPs for the two fibers were assumed for the purpose of the above calculations, but other RIPs are possible, and claimed subject matter is not limited in this regard.

FIGS. 7-10 depict experimental results (measured intensity distributions) to illustrate further output beams for various bend radii of VBC fiber 200 shown in FIG. 2.

Figure 7:
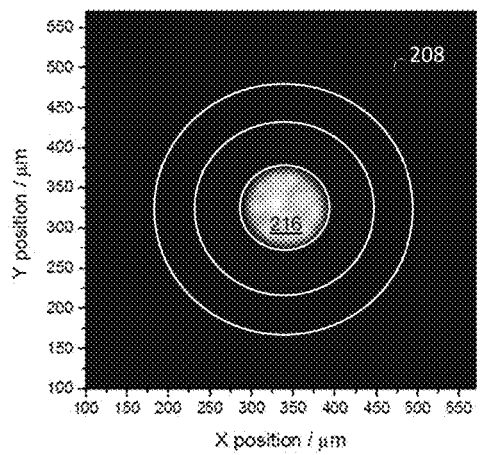
FIGS. 7-10 depict experimental results to illustrate further output beams for various bend radii of a fiber for varying beam characteristics shown in FIG. 2.
Figure 8:
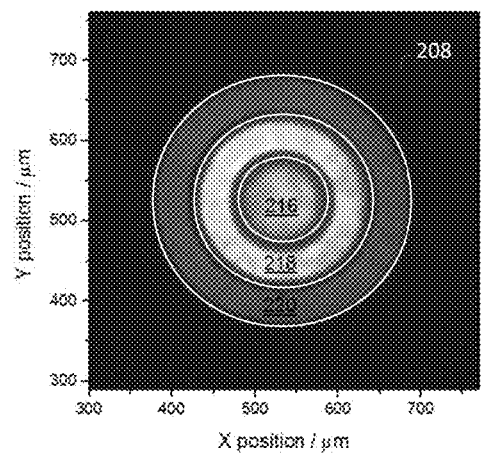
Figure 9:
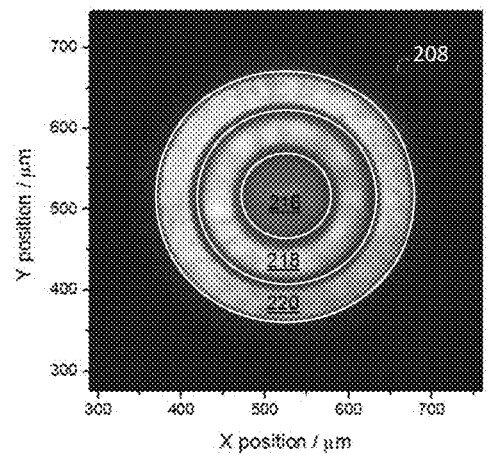
Figure 10:
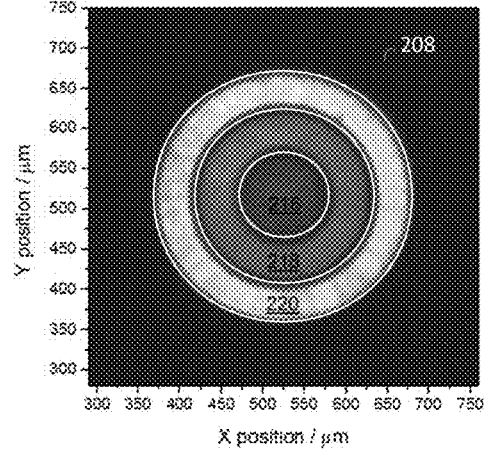

In FIG. 7 when VBC fiber 200 is straight, the beam is nearly completely confined to confinement region 216. As the bend radius is decreased, the intensity distribution at the output shifts to the larger diameters of confinement regions 218 and 220 located farther away from confinement region 216—see e.g., this shift visible in FIGS. 8-10. FIG. 8 depicts the intensity distribution when the bend radius of VBC fiber 200 is chosen to shift the intensity distribution preferentially to confinement region 218. FIG. 9 depicts the experimental results when the bend radius is further reduced and chosen to shift the intensity distribution outward to confinement region 220 and confinement region 218. In FIG. 10, at the smallest bend radius, the beam is nearly a "donut mode," with most of the intensity in the outermost confinement region 220.

Despite excitation of the confinement regions from one side at the splice junction 206, the intensity distributions are nearly symmetric azimuthally because of scrambling within confinement regions as the beam propagates within the VBC fiber 200. Although the beam will typically scramble azimuthally as it propagates, various structures or perturbations (e.g., coils) could be included to facilitate this process.

For the fiber parameters used in the experiment shown in FIGS. 7-10, particular confinement regions were not exclusively excited because some intensity was present in multiple confinement regions. This feature may enable advantageous materials processing applications that are optimized by having a flatter or distributed beam intensity distribution. In applications requiring cleaner excitation of a given confinement region, different fiber RIPs could be employed to enable this feature.

The results shown in FIGS. 7-10 pertain to the particular fibers used in this experiment, and the details will vary depending on the specifics of the implementation. In particular, the spatial profile and divergence distribution of the output beam and their dependence on bend radius will depend on the specific RIPs employed, on the splice parameters, and on the characteristics of the laser source launched into the first fiber.

Different fiber parameters from those shown in FIG. 2 may be used and still be within the scope of the claimed subject matter. Specifically, different RIPs and core sizes and shapes may be used to facilitate compatibility with different input beam profiles and to enable different output beam characteristics. Example RIPs for the first length of fiber, in addition to the parabolic-index profile shown in FIG. 2, include other graded-index profiles, step-index, pedestal designs (i.e., nested cores with progressively lower refractive indices with increasing distance from the center of the fiber), and designs with nested cores with the same refractive index value but with various NA values for the central core and the surrounding rings. Example RIPs for the second length of fiber, in addition to the profile shown in FIG. 2, include confinement fibers with different numbers of confinement regions, non-uniform confinement-region thicknesses, different and/or non-uniform values for the thicknesses of the rings surrounding the confinement regions, different and/or non-uniform NA values for the confinement regions, different refractive-index values for the high-index and low-index portions of the RIP, non-circular confinement regions (such as elliptical, oval, polygonal, square, rectangular, or combinations thereof), as well as other designs as discussed in further detail with respect to FIGS. 26-28. Furthermore, VBC fiber 200 and other examples of a VBC fiber described herein are not restricted to use of two fibers. In some examples, implementation may include use of one fiber or more than two fibers. In some cases, the fiber(s) may not be axially uniform; for example, they could include fiber Bragg gratings or long-period gratings, or the diameter could vary along the length of the fiber. In addition, the fibers do not have to be azimuthally symmetric, e.g., the core(s) could have square or polygonal shapes. Various fiber coatings (buffers) may be employed, including high-index or index-matched coatings (which strip light at the glass-polymer interface) and low-index coatings (which guide light by total internal reflection at the glass-polymer interface). In some examples, multiple fiber coatings may be used on VBC fiber 200.

FIGS. 11-16 illustrate cross-sectional views of examples of first lengths of fiber for enabling adjustment of beam characteristics in a VBC fiber responsive to perturbation of an optical beam propagating in the first lengths of fiber. Some examples of beam characteristics that may be adjusted in the first length of fiber are: beam diameter, beam divergence distribution, BPP, intensity distribution, luminance, $M^2$ factor, NA, optical intensity profile, power density profile, radial beam position, radiance, spot size, or the like, or any combination thereof. The first lengths of fiber depicted in FIGS. 11-16 and described below are merely examples and do not provide an exhaustive recitation of the variety of first lengths of fiber that may be utilized to enable adjustment of beam characteristics in a VBC fiber assembly. Selection of materials, appropriate RIPs, and other variables for the first lengths of fiber illustrated in FIGS. 11-16 at least depend on a desired beam output. A wide variety of fiber variables are contemplated and are within the scope of the claimed subject matter. Thus, claimed subject matter is not limited by examples provided herein.

Figure 11:
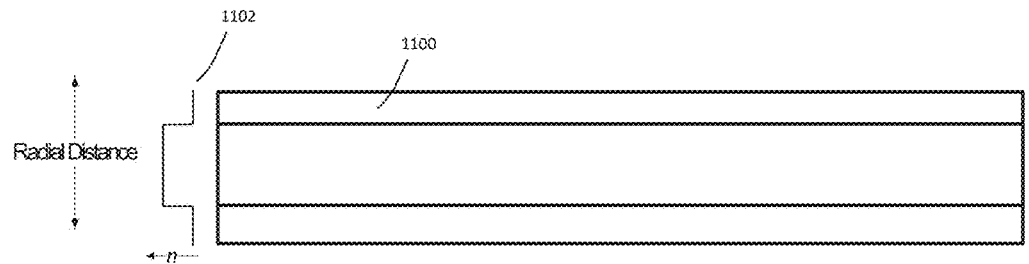
FIGS. 11-16 illustrate cross-sectional views of example first lengths of fiber for enabling adjustment of beam characteristics in a fiber assembly.
Figure 12:
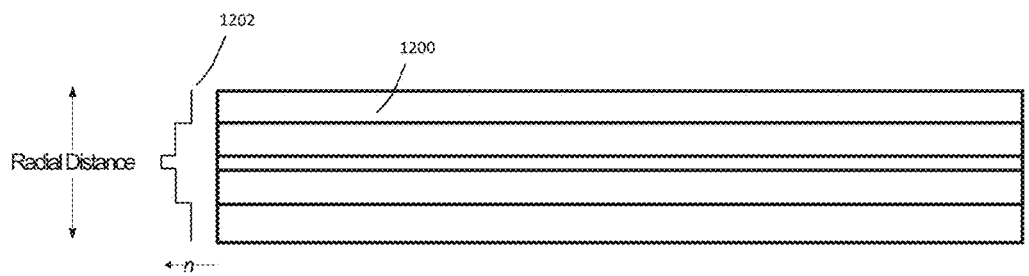
Figure 13:
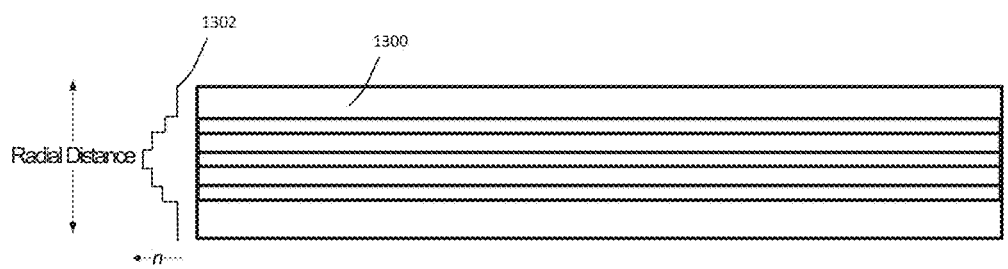

In FIG. 11 first length of fiber 1100 comprises a step-index profile 1102. FIG. 12 illustrates a first length of fiber 1200 comprising a "pedestal RIP" (i.e., a core comprising a step-index region surrounded by a larger step-index region) 1202. FIG. 13 illustrates a first length of fiber 1300 comprising a multiple-pedestal RIP 1302.

Figure 14A:
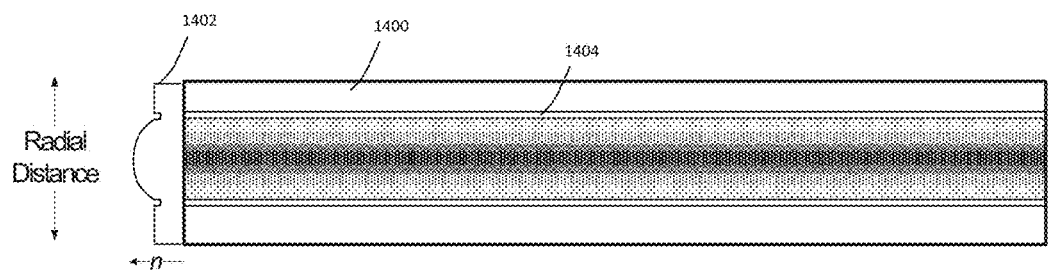

FIG. 14A illustrates a first length of fiber 1400 comprising a graded-index profile 1418 surrounded by a down-doped region 1404. When the fiber 1400 is perturbed, modes may shift radially outward in fiber 1400 (e.g., during bending of fiber 1400). Graded-index profile 1402 may be designed to promote maintenance or even compression of modal shape. This design may promote adjustment of a beam propagating in fiber 1400 to generate a beam having a beam intensity distribution concentrated in an outer perimeter of the fiber (i.e., in a portion of the fiber core that is displaced from the fiber axis). As described above, when the adjusted beam is coupled into a second length of fiber having confinement regions, the intensity distribution of the adjusted beam may be trapped in the outermost confinement region, providing a donut shaped intensity distribution. A beam spot having a narrow outer confinement region may be useful to enable certain material processing actions.

Figure 14B:
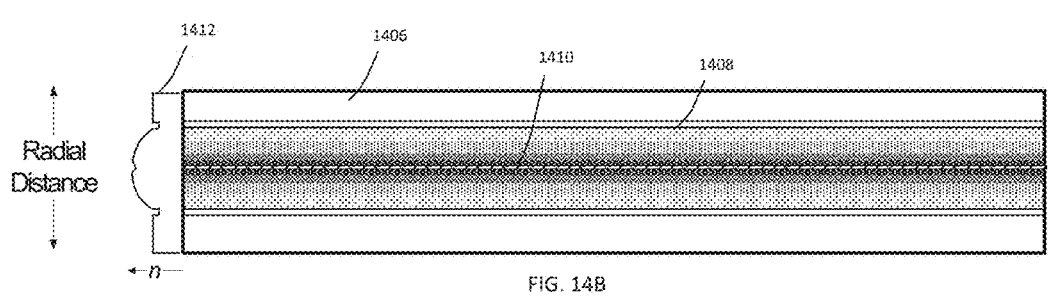

FIG. 14B illustrates a first length of fiber 1406 comprising a graded-index profile 1414 surrounded by a down-doped region 1408 similar to that of fiber 1400. However, fiber 1406 includes a divergence structure 1410 (a lower-index region) as can be seen in profile 1412. The divergence structure 1410 is an area of material with a lower refractive index than that of the surrounding core. As the beam is launched into first length of fiber 1406, refraction from divergence structure 1410 causes the beam divergence to increase in first length of fiber 1406. The amount of increased divergence depends on the amount of spatial overlap of the beam with the divergence structure 1410 and the magnitude of the index difference between the divergence structure 1410 and the core material. Divergence structure 1410 can have a variety of shapes, depending on the input divergence distribution and desired output divergence distribution. In an example, divergence structure 1410 has a triangular or graded index shape.

Figure 15:
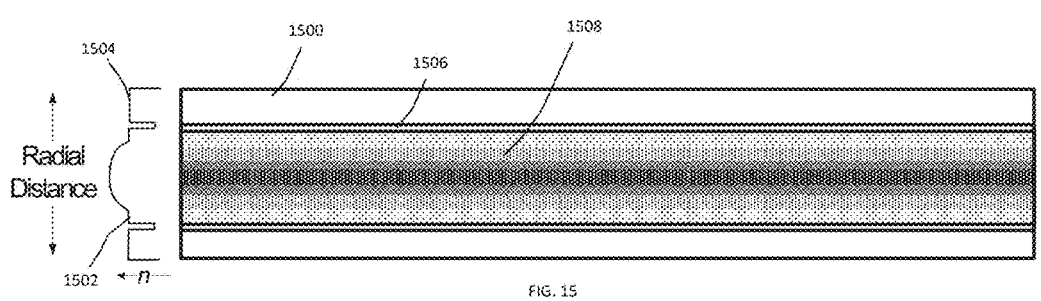

FIG. 15 illustrates a first length of fiber 1500 comprising a parabolic-index central region 1502 surrounded by a constant-index region 1504. Between the constant-index region 1504 and the parabolic-index central region 1502 is a lower-index annular layer (or lower-index ring or annulus) 1506 surrounding the parabolic-index central region 1502. The lower-index annulus 1506 helps guide a beam propagating in fiber 1500. When the propagating beam is perturbed, modes shift radially outward in fiber 1500 (e.g., during bending of fiber 1500). As one or more modes shift radially outward, parabolic-index region 1502 promotes retention of modal shape. When the modes reach the constant-index region 1504 at outer portions of a RIP 1510, they will be compressed against the lower-index ring 1506, which (in comparison to the first fiber RIP shown in FIGS. 14A and 14B) may cause preferential excitation of the outermost confinement region in the second fiber. In one implementation, this fiber design works with a confinement fiber having a central step-index core and a single annular core. The parabolic-index portion 1502 of the RIP 1510 overlaps with the central step-index core of the confinement fiber. The constant-index portion 1504 overlaps with the annular core of the confinement fiber. The constant-index portion 1504 of the first fiber is intended to make it easier to move the beam into overlap with the annular core by bending. This fiber design also works with other designs of the confinement fiber.

Figure 16:
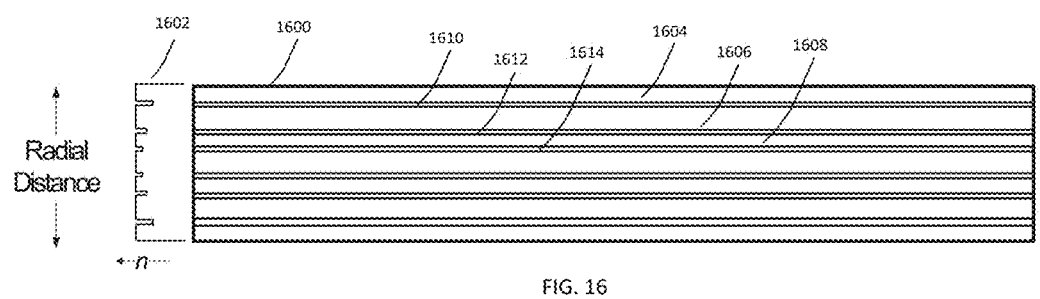

FIG. 16 illustrates a first length of fiber 1600 comprising guiding regions 1604, 1606, 1608, and 1616 bounded by lower-index layers 1610, 1612, and 1614 where the indexes of the lower-index layers 1610, 1612, and 1614 are stepped or, more generally, do not all have the same value. The stepped-index layers may serve to bound the beam intensity to certain guiding regions (1604, 1606, 1608, and 1616) when the perturbation assembly 210 (see FIG. 2) acts on the fiber 1600. In this way, adjusted beam light may be trapped in the guiding regions over a range of perturbation actions (such as over a range of bend radii, a range of bend lengths, a range of micro-bending pressures, and/or a range of acousto-optical signals), allowing for a certain degree of perturbation tolerance before a beam intensity distribution is shifted to a more distant radial position in fiber 1600. Thus, variation in beam characteristics may be controlled in a step-wise fashion. The radial widths of the guiding regions 1604, 1606, 1608, and 1616 may be adjusted to achieve a desired ring width, as may be required by an application. Also, a guiding region can have a thicker radial width to facilitate trapping of a larger fraction of the incoming beam profile if desired. Region 1606 is an example of such a design.

FIGS. 17-21 depict examples of fibers configured to enable maintenance and/or confinement of adjusted beam characteristics in the second length of fiber (e.g., fiber 208). These fiber designs are referred to as "ring-shaped confinement fibers" because they contain a central core surrounded by annular or ring-shaped cores. These designs are merely examples and not an exhaustive recitation of the variety of fiber RIPs that may be used to enable maintenance and/or confinement of adjusted beam characteristics within a fiber. Thus, claimed subject matter is not limited to the examples provided herein. Moreover, any of the first lengths of fiber described above with respect to FIGS. 11-16 may be combined with any of the second length of fiber described FIGS. 17-21.

Figure 17:
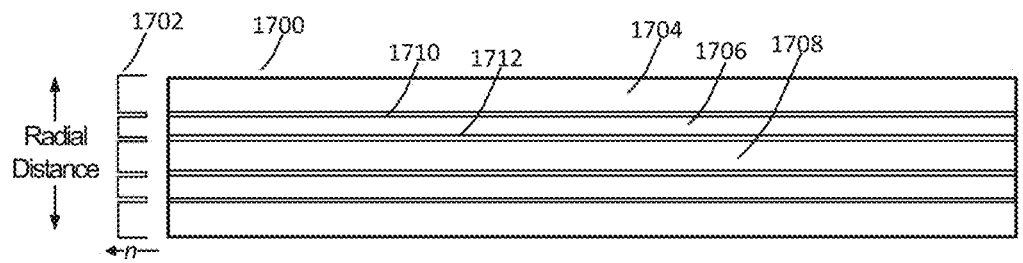
FIGS. 17-19 illustrate cross-sectional views of example second lengths of fiber ("confinement fibers") for confining adjusted beam characteristics in a fiber assembly.

FIG. 17 illustrates a cross-sectional view of an example second length of fiber for maintaining and/or confining adjusted beam characteristics in a VBC fiber assembly. As the perturbed beam is coupled from a first length of fiber to a second length of fiber 1700, the second length of fiber 1700 may maintain at least a portion of the beam characteristics adjusted in response to perturbation in the first length of fiber within one or more of confinement regions 1704, 1706, and/or 1708. Fiber 1700 has a RIP 1702. Each of confinement regions 1704, 1706, and/or 1708 is bounded by a lower index layer 1710 and/or 1712. This design enables second length of fiber 1700 to maintain the adjusted beam characteristics. As a result, a beam output by fiber 1700 will substantially maintain the received adjusted beam as modified in the first length of fiber giving the output beam adjusted beam characteristics, which may be customized to a processing task or other application.

Figure 18:
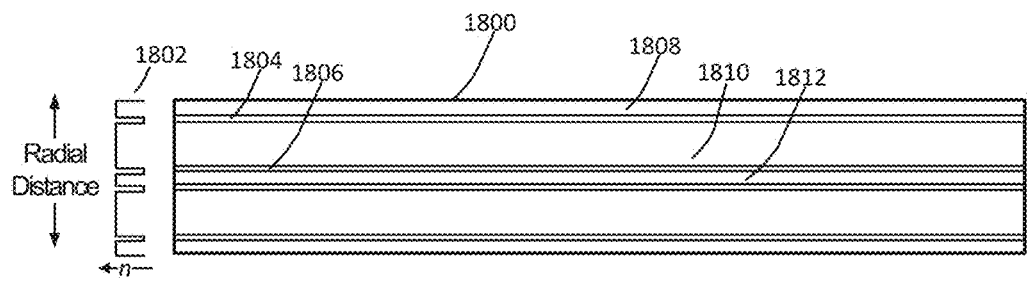

Similarly, FIG. 18 depicts a cross-sectional view of an example second length of fiber 1800 for maintaining and/or confining beam characteristics adjusted in response to perturbation in the first length of fiber in a VBC fiber assembly. Fiber 1800 has a RIP 1802. However, confinement regions 1808, 1810, and/or 1812 have different thicknesses from the thicknesses of confinement regions 1704, 1706, and 1708. Each of confinement regions 1808, 1810, and/or 1812 is bounded by a lower index layer 1804 and/or 1806. Varying the thicknesses of the confinement regions (and/or barrier regions) enables tailoring or optimization of a confined adjusted radiance profile by selecting particular radial positions within which to confine an adjusted beam.

Figure 19:
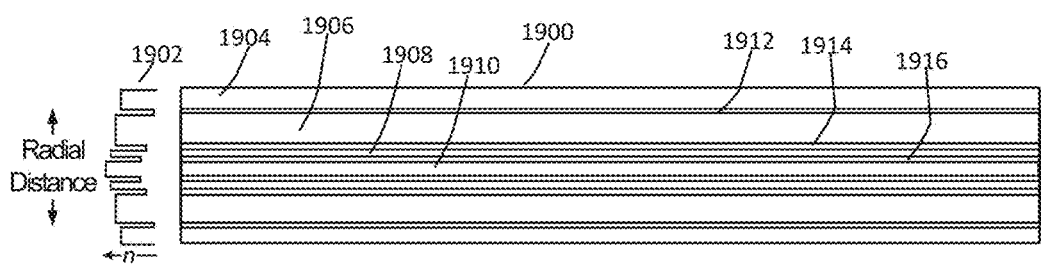

FIG. 19 depicts a cross-sectional view of an example second length of fiber 1900 having a RIP 1902 for maintaining and/or confining an adjusted beam in a VBC fiber assembly configured to provide variable beam characteristics. In this example, the number and thicknesses of confinement regions 1904, 1906, 1908, and 1910 are different from those of fiber 1700 and 1800; and the barrier layers 1912, 1914, and 1916 are of varied thicknesses as well. Furthermore, confinement regions 1904, 1906, 1908, and 1910 have different indexes of refraction; and barrier layers 1912, 1914, and 1916 have different indexes of refraction as well. This design may further enable a more granular or optimized tailoring of the confinement and/or maintenance of an adjusted beam radiance to particular radial locations within fiber 1900. As the perturbed beam is launched from a first length of fiber to second length of fiber 1900, the modified beam characteristics of the beam (having an adjusted intensity distribution, radial position, and/or divergence angle, or the like, or a combination thereof) is confined within a specific radius by one or more of confinement regions 1904, 1906, 1908, and/or 1910 of second length of fiber 1900.

As noted previously, the divergence angle of a beam may be conserved or adjusted and then conserved in the second length of fiber. There are a variety of methods to change the divergence angle of a beam. The following are examples of fibers configured to enable adjustment of the divergence angle of a beam propagating from a first length of fiber to a second length of fiber in a fiber assembly for varying beam characteristics. However, these are merely examples and not an exhaustive recitation of the variety of methods that may be used to enable adjustment of divergence of a beam. Thus, claimed subject matter is not limited to the examples provided herein.

Figure 20:
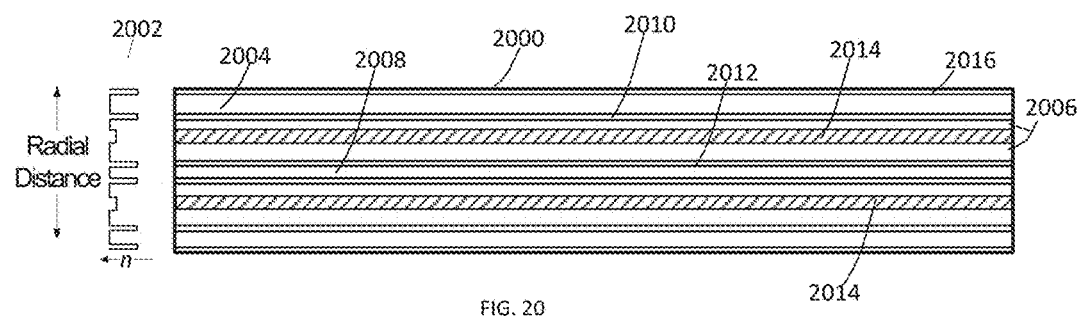
FIGS. 20 and 21 illustrate cross-sectional views of example second lengths of fiber for changing a divergence angle of and confining an adjusted beam in a fiber assembly configured to provide variable beam characteristics.

FIG. 20 depicts a cross-sectional view of an example second length of fiber 2000 having a RIP 2002 for modifying, maintaining, and/or confining beam characteristics adjusted in response to perturbation in the first length of fiber. In this example, second length of fiber 2000 is similar to the previously described second lengths of fiber and forms a portion of the VBC fiber assembly for delivering variable beam characteristics as discussed above. There are three confinement regions 2004, 2006, and 2008 and three barrier layers 2010, 2012, and 2016. Second length of fiber 2000 also has a divergence structure 2014 situated within the confinement region 2006. The divergence structure 2014 is an area of material with a lower refractive index than that of the surrounding confinement region. As the beam is launched into second length of fiber 2000, refraction from divergence structure 2014 causes the beam divergence to increase in second length of fiber 2000. The amount of increased divergence depends on the amount of spatial overlap of the beam with the divergence structure 2014 and the magnitude of the index difference between the divergence structure 2014 and the core material. By adjusting the radial position of the beam near the launch point into the second length of fiber 2000, the divergence distribution may be varied. The adjusted divergence of the beam is conserved in fiber 2000, which is configured to deliver the adjusted beam to the process head, another optical system (e.g., fiber-to-fiber coupler or fiber-to-fiber switch), the workpiece, or the like, or a combination thereof. In an example, divergence structure 2014 may have an index dip of about $10^{-5}$-$3\times10^{-2}$ with respect to the surrounding material. Other values of the index dip may be employed within the scope of this disclosure, and claimed subject matter is not so limited.

Figure 21:
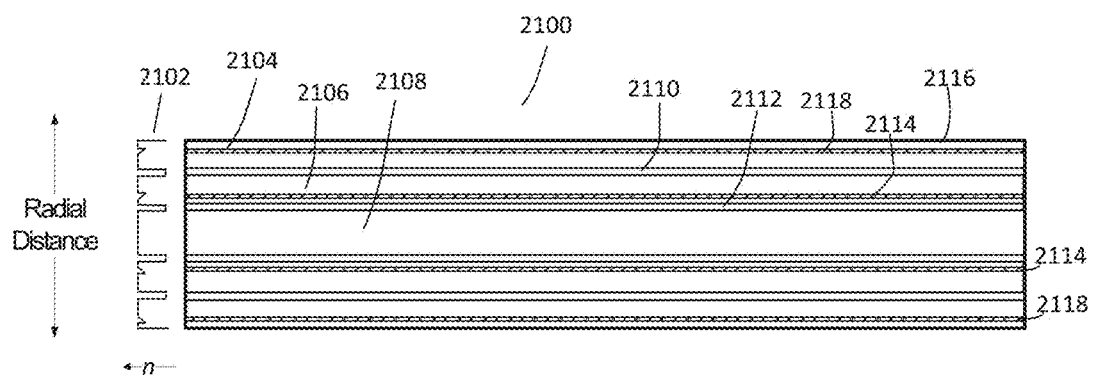

FIG. 21 depicts a cross-sectional view of an example second length of fiber 2100 having a RIP 2102 for modifying, maintaining, and/or confining beam characteristics adjusted in response to perturbation in the first length of fiber. Second length of fiber 2100 forms a portion of a VBC fiber assembly for delivering a beam having variable characteristics. In this example, there are three confinement regions 2104, 2106, and 2108 and three barrier layers 2110, 2112, and 2116. Second length of fiber 2100 also has a plurality of divergence structures 2114 and 2118. The divergence structures 2114 and 2118 are areas of graded lower index material. As the beam is launched from the first length fiber into second length of fiber 2100, refraction from divergence structures 2114 and 2118 causes the beam divergence to increase. The amount of increased divergence depends on the amount of spatial overlap of the beam with the divergence structure and the magnitude of the index difference between the divergence structure 2114 and/or 2118 and the surrounding core material of confinement regions 2106 and 2104 respectively. By adjusting the radial position of the beam near the launch point into the second length of fiber 2100, the divergence distribution may be varied. The design shown in FIG. 21 allows the intensity distribution and the divergence distribution to be varied somewhat independently by selecting both a particular confinement region and the divergence distribution within that confinement region (because each confinement region may include a divergence structure). The adjusted divergence of the beam is conserved in fiber 2100, which is configured to deliver the adjusted beam to the process head, another optical system, or the workpiece. Forming the divergence structures 2114 and 2118 with a graded or non-constant index enables tuning of the divergence profile of the beam propagating in fiber 2100. An adjusted beam characteristic such as a radiance profile and/or divergence profile may be conserved as it is delivered to a process head by the second fiber. Alternatively, an adjusted beam characteristic such as a radiance profile and/or divergence profile may be conserved or further adjusted as it is routed by the second fiber through a fiber-to-fiber coupler (FFC) and/or fiber-to-fiber switch (FFS) and to a process fiber, which delivers the beam to the process head or the workpiece.

Figure 26:
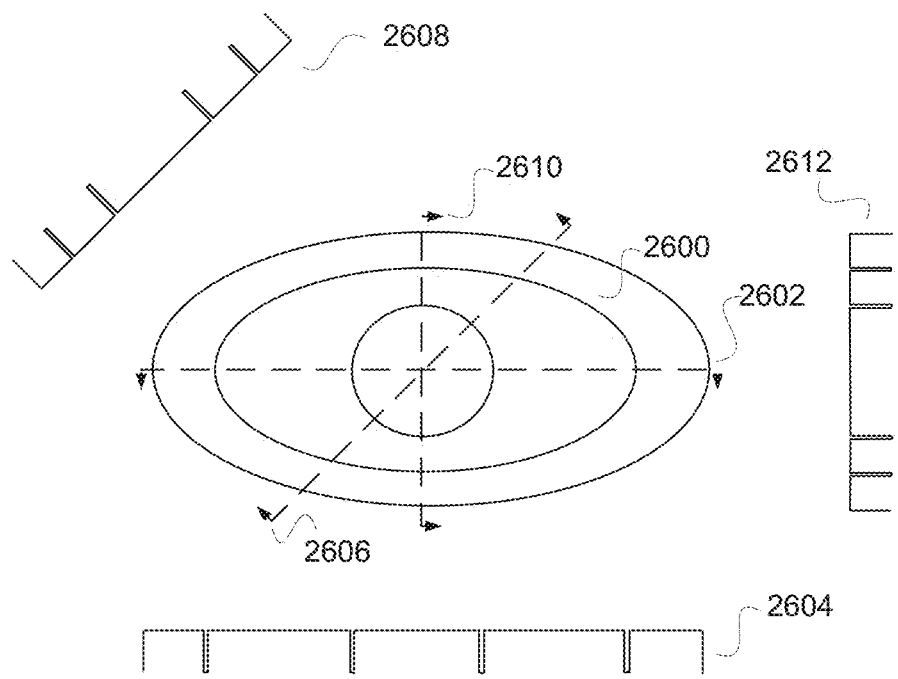
FIGS. 26-28 are cross-sectional views illustrating example second lengths of fiber ("confinement fibers") for confining adjusted beam characteristics in a fiber assembly.
Figure 27:
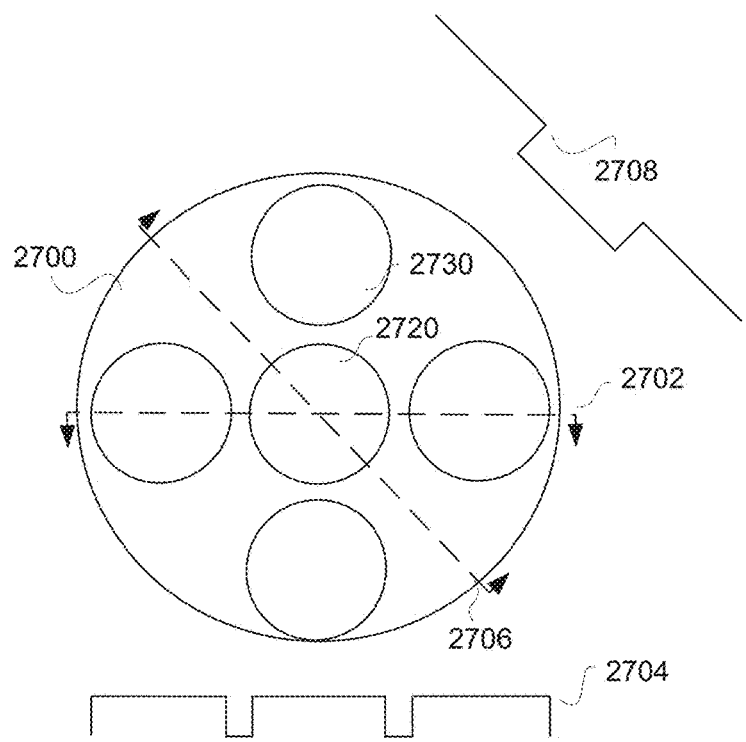
Figure 28:
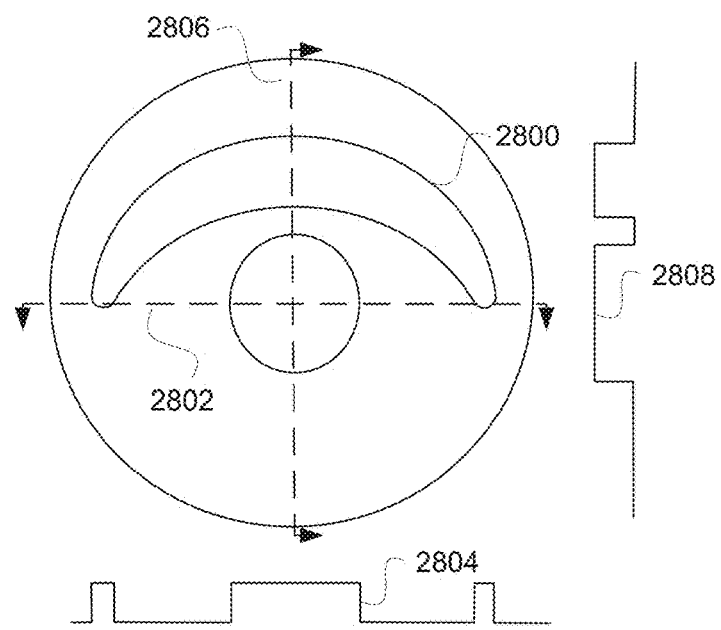

FIGS. 26-28 are cross-sectional views illustrating examples of fibers and fiber RIPs configured to enable maintenance and/or confinement of adjusted beam characteristics of a beam propagating in an azimuthally asymmetric second length of fiber, wherein the beam characteristics are adjusted responsive to perturbation of a first length of fiber coupled to the second length of fiber and/or perturbation of the beam by a perturbation device 110. These azimuthally asymmetric designs are merely examples and are not an exhaustive recitation of the variety of fiber RIPs that may be used to enable maintenance and/or confinement of adjusted beam characteristics within an azimuthally asymmetric fiber. Thus, claimed subject matter is not limited to the examples provided herein. Moreover, any of a variety of first lengths of fiber (e.g., like those described above) may be combined with any azimuthally asymmetric second length of fiber (e.g., like those described in FIGS. 26-28).

FIG. 26 illustrates RIPs at various azimuthal angles of a cross-section through an elliptical fiber 2600. At a first azimuthal angle 2602, fiber 2600 has a first RIP 2604. At a second azimuthal angle 2606 that is rotated 45° from first azimuthal angle 2602, fiber 2600 has a second RIP 2608. At a third azimuthal angle 2610 that is rotated another 45° from second azimuthal angle 2606, fiber 2600 has a third RIP 2612. First, second, and third RIPs 2604, 2608, and 2612 are all different.

FIG. 27 illustrates RIPs at various azimuthal angles of a cross-section through an MCF 2700. At a first azimuthal angle 2702, fiber 2700 has a first RIP 2704. At a second azimuthal angle 2706, fiber 2700 has a second RIP 2708. First and second RIPs 2704 and 2708 are different. In an example, perturbation device 110 may act in multiple planes in order to launch the adjusted beam into different regions of an azimuthally asymmetric second fiber.

FIG. 28 illustrates RIPs at various azimuthal angles of a cross-section through a fiber 2800 having at least one crescent shaped core. In some cases, the corners of the crescent may be rounded, flattened, or otherwise shaped, which may minimize optical loss. At a first azimuthal angle 2802, fiber 2800 has a first RIP 2804. At a second azimuthal angle 2806, fiber 2800 has a second RIP 2808. First and second RIPs 2804 and 2808 are different.

Figure 22A:
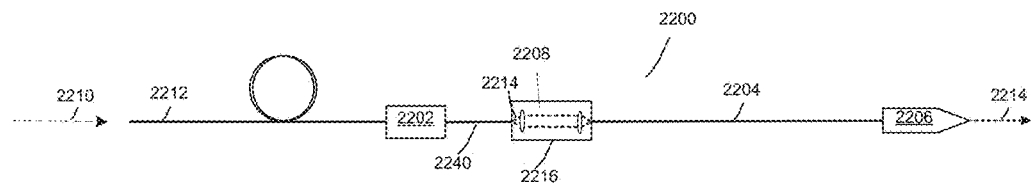
FIG. 22A illustrates an example laser system including a fiber assembly configured to provide variable beam characteristics disposed between a feeding fiber and process head.

FIG. 22A illustrates an example of a laser system 2200 including a VBC fiber assembly 2202 configured to provide variable beam characteristics. VBC fiber assembly 2202 comprises a first length of fiber 104, a second length of fiber 108, and a perturbation device 110. VBC fiber assembly 2202 is disposed between feeding fiber 2212 (i.e., the output fiber from the laser source) and VBC delivery fiber 2240. VBC delivery fiber 2240 may comprise second length of fiber 108 or an extension of second length of fiber 108 that modifies, maintains, and/or confines adjusted beam characteristics. Beam 2210 is coupled into VBC fiber assembly 2202 via feeding fiber 2212. Fiber assembly 2202 is configured to vary the characteristics of beam 2210 in accordance with the various examples described above. The output of fiber assembly 2202 is adjusted beam 2214, which is coupled into VBC delivery fiber 2240. VBC delivery fiber 2240 delivers adjusted beam 2214 to a free-space optics assembly 2208, which then couples beam 2214 into a process fiber 2204. Adjusted beam 2214 is then delivered to process head 2206 by process fiber 2204. The process head can include guided wave optics (such as fibers and fiber coupler), free space optics (such as lenses, mirrors, optical filters, diffraction gratings), and/or beam scan assemblies (such as galvanometer scanners, polygonal mirror scanners, or other scanning systems) that are used to shape the beam 2214 and deliver the shaped beam to a workpiece.

In laser system 2200, one or more of the free-space optics of assembly 2208 may be disposed in an FFC or other beam coupler 2216 to perform a variety of optical manipulations of an adjusted beam 2214 (represented in FIG. 22A with different dashing from that of beam 2210). For example, free-space optics assembly 2208 may preserve the adjusted beam characteristics of beam 2214. Process fiber 2204 may have the same RIP as VBC delivery fiber 2240. Thus, the adjusted beam characteristics of adjusted beam 2214 may be preserved all the way to process head 2206. Process fiber 2204 may comprise a RIP similar to any of the second lengths of fiber described above, including confinement regions.

Figure 22B:
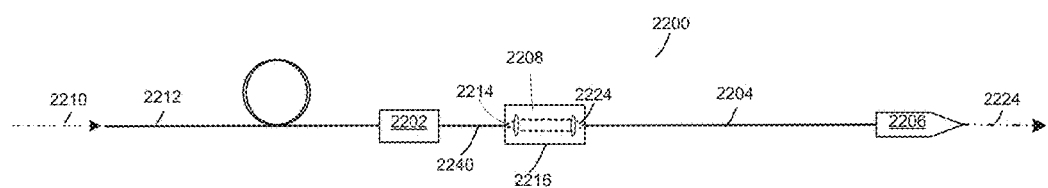
FIG. 22B illustrates an example a laser system including a fiber assembly configured to provide variable beam characteristics disposed between a feeding fiber and process head.

Alternatively, as illustrated in FIG. 22B, free-space optics assembly 2208 may change the adjusted beam characteristics of beam 2214 by, for example, increasing or decreasing the divergence and/or the spot size of beam 2214 (e.g., by magnifying or demagnifying beam 2214) and/or otherwise further modifying adjusted beam 2214. Furthermore, process fiber 2204 may have a different RIP than VBC delivery fiber 2240. Accordingly, the RIP of process fiber 2204 may be selected to preserve additional adjustment of adjusted beam 2214 made by the free-space optics of assembly 2208 to generate a twice adjusted beam 2224 (represented in FIG. 22B with different dashing from that of beam 2214).

Figure 23:
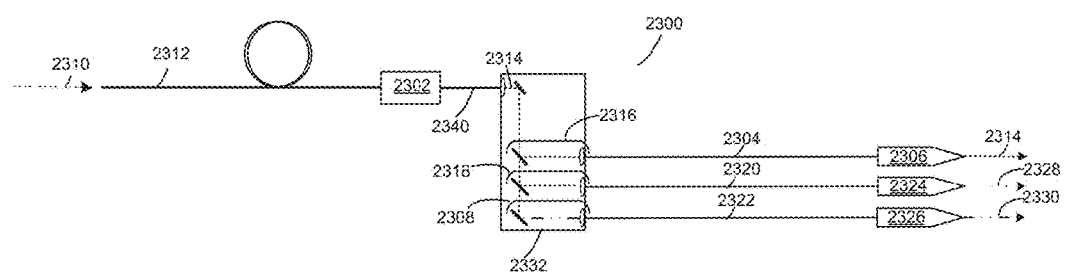
FIG. 23 illustrates an example laser system including a fiber assembly configured to provide variable beam characteristics disposed between a feeding fiber and multiple process fibers.

FIG. 23 illustrates an example of a laser system 2300 including VBC fiber assembly 2302 disposed between a feeding fiber 2312 and a VBC delivery fiber 2340. During operation, a beam 2310 is coupled into VBC fiber assembly 2302 via feeding fiber 2312. Fiber assembly 2302 includes a first length of fiber 104, a second length of fiber 108, and a perturbation device 110 and is configured to vary characteristics of beam 2310 in accordance with the various examples described above. Fiber assembly 2302 generates an adjusted beam 2314 output by VBC delivery fiber 2340. VBC delivery fiber 2340 comprises a second length of fiber 108 of fiber for modifying, maintaining, and/or confining adjusted beam characteristics in a fiber assembly 2302 in accordance with the various examples described above (see FIGS. 17-21, for example). VBC delivery fiber 2340 couples adjusted beam 2314 into a beam switch (FFS) 2332, which then couples its various output beams to one or more of multiple process fibers 2304, 2320, and 2322. Process fibers 2304, 2320, and 2322 deliver adjusted beams 2314, 2328, and 2330 to respective process heads 2306, 2324, and 2326.

In an example, beam switch 2332 includes one or more sets of free-space optics 2308, 2316, and 2318 configured to perform a variety of optical manipulations of adjusted beam 2314. Free-space optics 2308, 2316, and 2318 may preserve or vary adjusted beam characteristics of beam 2314. Thus, adjusted beam 2314 may be maintained by the free-space optics or adjusted further. Process fibers 2304, 2320, and 2322 may have the same or a different RIP as that of VBC delivery fiber 2340, depending on whether it is desirable to preserve or further modify a beam passing from the free-space optics assemblies 2308, 2316, and 2318 to respective process fibers 2304, 2320, and 2322. In other examples, one or more beam portions of beam 2310 are coupled to a workpiece without adjustment, or different beam portions are coupled to respective VBC fiber assemblies so that beam portions associated with a plurality of beam characteristics can be provided for simultaneous workpiece processing. Alternatively, beam 2310 can be switched to one or more of a set of VBC fiber assemblies.

Routing adjusted beam 2314 through any of free-space optics assemblies 2308, 2316, and 2318 enables delivery of a variety of additionally adjusted beams to process heads 2206, 2324, and 2326. Therefore, laser system 2300 provides additional degrees of freedom for varying the characteristics of a beam, as well as switching the beam between process heads ("time sharing") and/or delivering the beam to multiple process heads simultaneously ("power sharing").

For example, free-space optics in beam switch 2332 may direct adjusted beam 2314 to free-space optics assembly 2316 configured to preserve the adjusted characteristics of beam 2314. Process fiber 2304 may have the same RIP as that of VBC delivery fiber 2340. Thus, the beam delivered to process head 2306 will be a preserved adjusted beam 2314.

In another example, beam switch 2332 may direct adjusted beam 2314 to free-space optics assembly 2318 configured to preserve the adjusted characteristics of adjusted beam 2314. Process fiber 2320 may have a different RIP from that of VBC delivery fiber 2340 and may be configured with divergence altering structures as described with respect to FIGS. 20 and 21 to provide additional adjustments to the divergence distribution of beam 2314. Thus, the beam delivered to process head 2324 will be a twice adjusted beam 2328 having a different beam divergence profile from that of adjusted beam 2314.

Process fibers 2304, 2320, and/or 2322 may comprise a RIP similar to any of the second lengths of fiber described above, including confinement regions or a wide variety of other RIPs, and claimed subject matter is not limited in this regard.

In yet another example, free-space optics switch 2332 may direct adjusted beam 2314 to free-space optics assembly 2308 configured to change the beam characteristics of adjusted beam 2314. Process fiber 2322 may have a different RIP from that of VBC delivery fiber 2340 and may be configured to preserve (or alternatively further modify) the new further adjusted characteristics of beam 2314. Thus, the beam delivered to process head 2326 will be a twice adjusted beam 2330 having different beam characteristics (due to the adjusted divergence profile and/or intensity profile) from those of adjusted beam 2314.

In FIGS. 22A, 22B, and 23, the optics in the FFC or FFS may adjust the spatial profile and/or divergence profile by magnifying or demagnifying the beam 2214 before launching into the process fiber. They may also adjust the spatial profile and/or divergence profile via other optical transformations. They may also adjust the launch position into the process fiber. These methods may be used alone or in combination.

FIGS. 22A, 22B, and 23 merely provide examples of combinations of adjustments to beam characteristics using free-space optics and various combinations of fiber RIPs to preserve or modify adjusted beams 2214 and 2314. The examples provided above are not exhaustive and are meant for illustrative purposes only. Thus, claimed subject matter is not limited in this regard.

Figure 24:
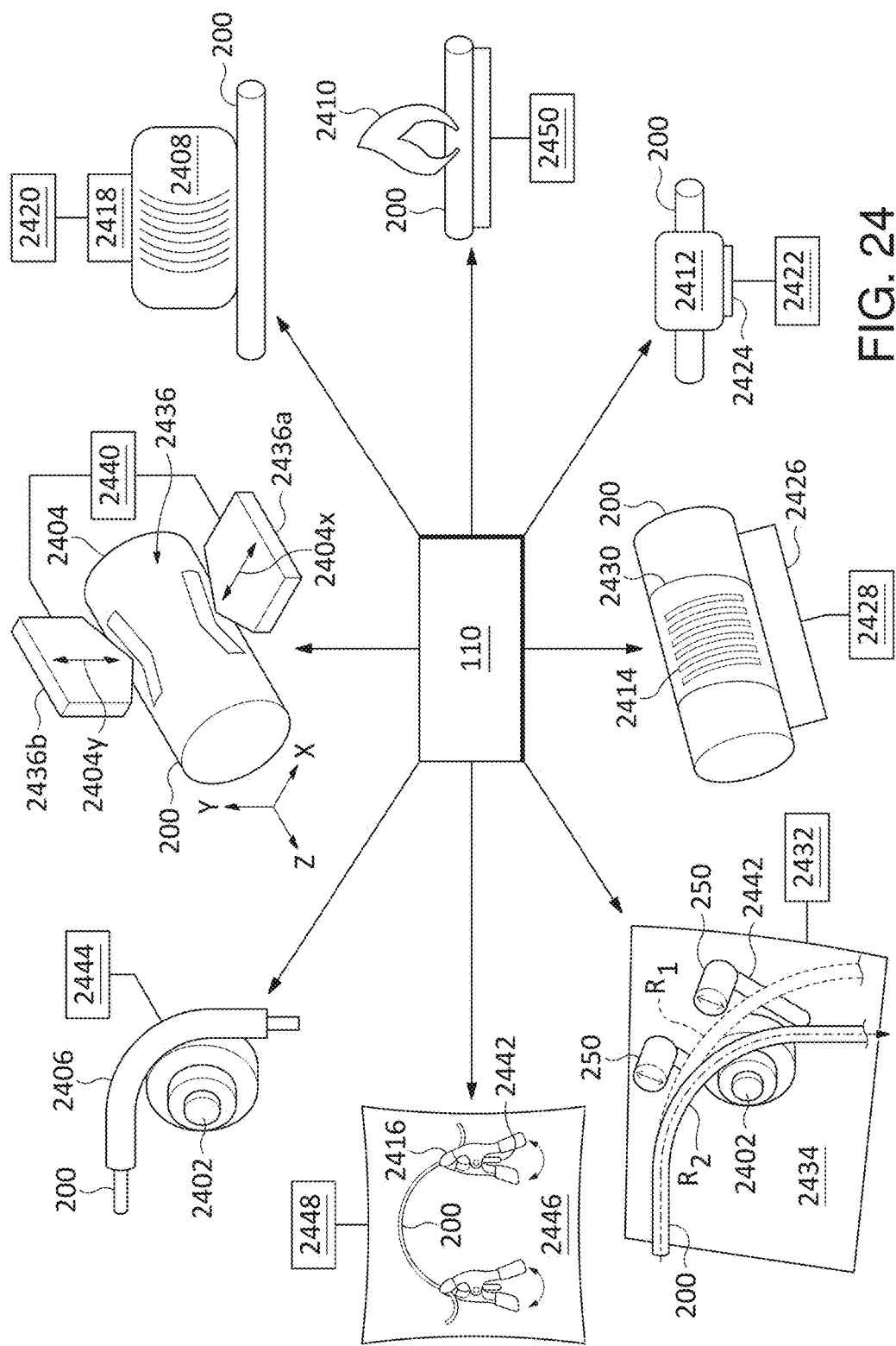
FIG. 24 illustrates examples of various perturbation assemblies for providing variable beam characteristics according to various examples provided herein.

FIG. 24 illustrates various examples of perturbation devices, assemblies or methods (for simplicity referred to collectively herein as "perturbation device 110") for perturbing a VBC fiber 200 and/or an optical beam propagating in VBC fiber 200 according to various examples provided herein. Perturbation device 110 may be any of a variety of devices, methods, and/or assemblies configured to enable adjustment of beam characteristics of a beam propagating in VBC fiber 200 in response to application of one or more of various states of perturbation. Some examples of various states of perturbation that may be applied to VBC fiber 200 include, but are not limited to, amount or direction of bending, lateral mechanical stress, acoustic wave oscillation-induced mechanical pressure, temperature variation, piezo-electric transducer displacement, and varying periodicity or amplitude of refractive grating. A variation in one or more states establishes a different state of perturbation. To vary one or more of these states, perturbation device 110 may be a mandrel 2402, a micro-bend 2404 in the VBC fiber, flexible tubing 2406, an acousto-optic transducer 2408, a thermal device 2410, a piezo-electric device 2412, a grating 2414, a clamp 2416 (or other fastener), or the like, or any combination thereof. These are merely examples of perturbation devices 100 and not an exhaustive listing of perturbation devices 100, and claimed subject matter is not limited in this regard.

Mandrel 2402 may be used to perturb VBC fiber 200 by providing a form about which VBC fiber 200 may be bent. As discussed above, reducing the bend radius of VBC fiber 200 moves the intensity distribution of the beam radially outward. In some examples, mandrel 2402 may be stepped or conically shaped to provide discrete bend radii levels. Alternatively, mandrel 2402 may comprise a cone shape without steps to provide continuous bend radii for more granular control of the bend radius. The radius of curvature of mandrel 2402 may be constant (e.g., a cylindrical form) or non-constant (e.g., an oval-shaped form). Similarly, flexible tubing 2406, clamps 2416 (or other varieties of fasteners), or rollers 250 may be used to guide and control the bending of VBC fiber 200 about mandrel 2402. Furthermore, changing the length over which the fiber is bent at a particular bend radius also may modify the intensity distribution of the beam. VBC fiber 200 and mandrel 2402 may be configured to change the intensity distribution within the first fiber predictably (e.g., in proportion to the length over which the fiber is bent and/or the bend radius). Rollers 250 may move up and down along a track 2442 on a platform 2434 to change the bend radius of VBC fiber 200.

Clamps 2416 (or other fasteners) may be used to guide and control the bending of VBC fiber 200 with or without a mandrel 2402. Clamps 2416 may move up and down along a track 2442 or a platform 2446. Clamps 2416 may also swivel to change bend radius, tension, or direction of VBC fiber 200. A controller 2448 may control the movement of clamps 2416.

In another example, perturbation device 110 may be flexible tubing 2406 and may guide bending of VBC fiber 200 with or without a mandrel 2402. Flexible tubing 2406 may encase VBC fiber 200. Tubing 2406 may be made of a variety of materials and may be manipulated using piezo-electric transducers controlled by a controller 2444. In another example, clamps or other fasteners may be used to move flexible tubing 2406.

Micro-bend 2404 in VBC fiber is a local perturbation caused by lateral mechanical stress on the fiber. Micro-bending can cause one or both of mode coupling and transitions from one confinement region to another confinement region within a fiber, resulting in varied beam characteristics of the beam propagating in a VBC fiber 200. Mechanical stress may be applied by an actuator 2436 that is controlled by controller 2440. For example, VBC perturbative device 110 can be configured to control in one axis or two axes the beam propagation path in VBC fiber 200 by imparting at selected radial locations micro-bend 2404 to VBC fiber 200. According to one embodiment, actuator 2436 includes two actuator probes 2436a and 2436b positioned to apply mechanical stress to VBC fiber 200 in orthogonal directions and thereby direct the beam propagating in VBC fiber 200 to any location in a two-dimensional space. In other embodiments several azimuthally spaced-apart probes (see e.g., FIG. 29, described later) are provided to apply force at discrete angles around a circumference so as to modify a beam propagation path. However, these are merely examples of methods for inducing mechanical stress in fiber 200 and claimed subject matter is not limited in this regard. Skilled persons will appreciate that various other techniques for beam steering are also suitable.

Acousto-optic transducer (AOT) 2408 may be used to induce perturbation of a beam propagating in the VBC fiber using an acoustic wave. The perturbation is caused by the modification of the refractive index of the fiber by the oscillating mechanical pressure of an acoustic wave. The period and strength of the acoustic wave are related to the acoustic wave frequency and amplitude, allowing dynamic control of the acoustic perturbation. Thus, a perturbation assembly 110 including AOT 2408 may be configured to vary the beam characteristics of a beam propagating in the fiber. In an example, a piezo-electric transducer 2418 may create the acoustic wave and may be controlled by a controller or driver 2420. The acoustic wave induced in AOT 2408 may be modulated to change and/or control the beam characteristics of the optical beam in VBC 200 in real-time. However, this is merely an example of a method for creating and controlling an AOT 2408, and claimed subject matter is not limited in this regard.

Thermal device 2410 may be used to induce perturbation of a beam propagating in VBC fiber using heat. The perturbation is caused by the modification of the RIP of the fiber induced by heat. Perturbation may be dynamically controlled by controlling an amount of heat transferred to the fiber and the length over which the heat is applied. Thus, a perturbation assembly 110 including thermal device 2410 may be configured to vary a range of beam characteristics. Thermal device 2410 may be controlled by a controller 2450.

Piezo-electric transducer 2412 may be used to induce perturbation of a beam propagating in a VBC fiber using piezoelectric action. The perturbation is caused by the modification of the RIP of the fiber induced by a piezoelectric material attached to the fiber. The piezoelectric material in the form of a jacket around the bare fiber may apply tension or compression to the fiber, modifying its refractive index via the resulting changes in density. Perturbation may be dynamically controlled by controlling a voltage to the piezo-electric device 2412. Thus, a perturbation assembly 110 including piezo-electric transducer 2412 may be configured to vary the beam characteristics over a particular range.

In an example, piezo-electric transducer 2412 may be configured to displace VBC fiber 200 in a variety of directions (e.g., axially, radially, and/or laterally) depending on a variety of factors, including how the piezo-electric transducer 2412 is attached to VBC fiber 200, the direction of the polarization of the piezo-electric materials, the applied voltage, etc. Additionally, bending of VBC fiber 200 is possible using the piezo-electric transducer 2412. For example, driving a length of piezo-electric material having multiple segments comprising opposing electrodes can cause a piezo-electric transducer 2412 to bend in a lateral direction. Voltage applied to piezoelectric transducer 2412 by an electrode 2424 may be controlled by a controller 2422 to control displacement of VBC fiber 200. Displacement may be modulated to change and/or control the beam characteristics of the optical beam in VBC 200 in real-time. However, this is merely an example of a method of controlling displacement of a VBC fiber 200 using a piezo-electric transducer 2412 and claimed subject matter is not limited in this regard.

Gratings 2414 may be used to induce perturbation of a beam propagating in a VBC fiber 200. A grating 2414 can be written into a fiber by inscribing a periodic variation of the refractive index into the core. Gratings 2414 such as fiber Bragg gratings can operate as optical filters or as reflectors. A long-period grating can induce transitions among co-propagating fiber modes. The radiance, intensity profile, and/or divergence profile of a beam comprised of one or more modes can thus be adjusted using a long-period grating to couple one or more of the original modes to one or more different modes having different radiance and/or divergence profiles. Adjustment is achieved by varying the periodicity or amplitude of the refractive index grating. Methods such as varying the temperature, bend radius, and/or length (e.g., stretching) of the fiber Bragg grating can be used for such adjustment. VBC fiber 200 having gratings 2414 may be coupled to a stage 2426. Stage 2426 may be configured to execute any of a variety of functions and may be controlled by a controller 2428. For example, stage 2426 may be coupled to VBC fiber 200 with fasteners 2430 and may be configured to stretch and/or bend VBC fiber 200 using fasteners 2430 for leverage. Stage 2426 may have an embedded thermal device and may change the temperature of VBC fiber 200.

Figure 25:
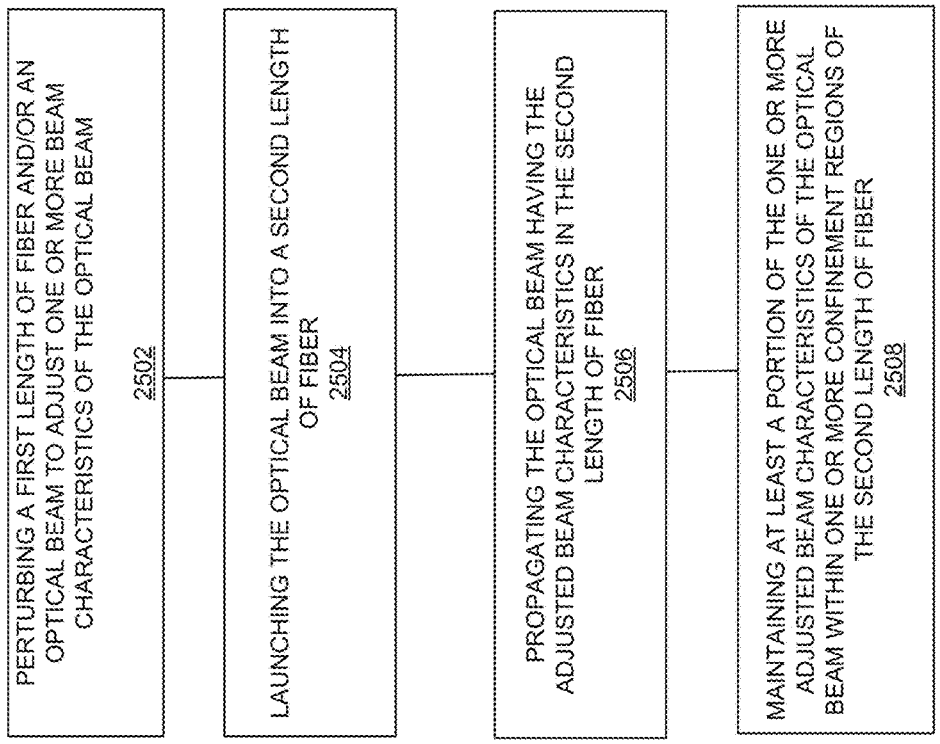
FIG. 25 illustrates an example process for adjusting and maintaining modified characteristics of an optical beam.

FIG. 25 illustrates an example process 2500 for adjusting and/or maintaining beam characteristics within a fiber without the use of free-space optics to adjust the beam characteristics. In block 2502, a first length of fiber and/or an optical beam are perturbed to adjust one or more optical beam characteristics. Process 2500 moves to block 2504, where the optical beam is launched into a second length of fiber. Process 2500 moves to block 2506, where the optical beam having the adjusted beam characteristics is propagated in the second length of fiber. Process 2500 moves to block 2508, where at least a portion of the one or more beam characteristics of the optical beam are maintained within one or more confinement regions of the second length of fiber. The first and second lengths of fiber may be comprised of the same fiber, or they may be different fibers.

Figure 29:
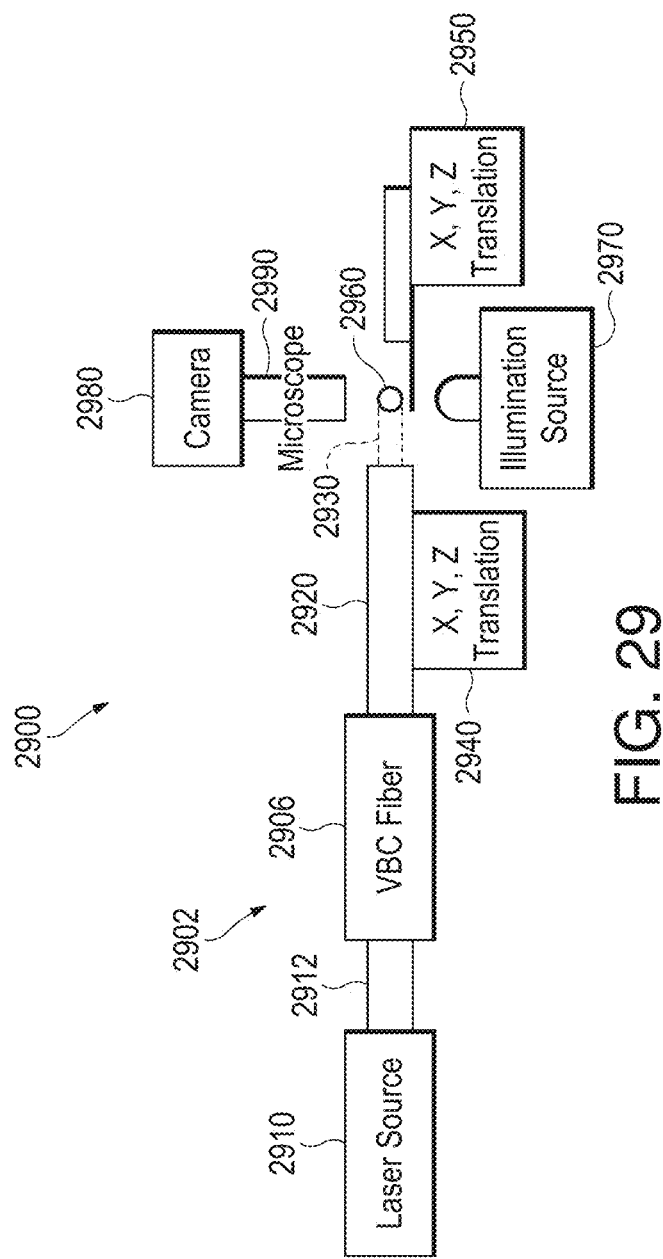
FIG. 29 is a block diagram of an optical probe, according to one embodiment.

FIG. 29 shows an example optical tweezer device (or more generally, an optical probe or optical trapping device) 2900 implemented with an optical beam delivery device 2902 in the form of a VBC fiber 2906, which is constructed in accordance with the disclosed paradigm represented by example VBC fiber 100 (see e.g., FIG. 1 for additional details). For conciseness, some previously described details of FIG. 1 are further simplified and, therefore, not reproduced in FIG. 29.

Laser source 2910 emits optical beam 102 (FIG. 1) propagating in a first length of fiber 2912, which corresponds to first length of fiber 104 (FIG. 1). Optical beam 102 is incident on VBC fiber 2906. Perturbation device 110 (FIG. 1) operating in combination with, and applying different states (e.g., different amounts or directions) of perturbation to, VBC fiber 2906 directs the fiber mode to different corresponding confinement regions (e.g., cores) of an MCF 2920, which corresponds to second length of fiber 108 (FIG. 1). In other words, VBC fiber 2906 enables all-fiber optical probe 2900 to move the fiber mode, i.e., the propagation path, of optical beam 102 to different positions (cores) in MCF 2920. For example, perturbation device 110, in response to a control signal, applies to VBC fiber 2906 a selected amount or direction of bend that shifts the fiber mode to a corresponding confinement region and thereby provides a means of moving optical trap locations established at an output of MCF 2920. Thus, optical beam 102 is processed in response to operation of perturbation device 110 (FIG. 1) to produce a moveable optical trap 2930 at a location corresponding to a selected state of perturbation applied to one or both of first and second lengths of fiber 2912 and 2920.

FIG. 29 also shows additional instrumentation including a microtranslation stage 2940 for MCF 2920, a microtranslation stage 2950 for a sample 2960 (e.g., a dielectric reactive particle or refractive bead(s) bearing material under analysis), an illumination source 2970 for imaging and observation, a camera 2980, and zoom optic or microscope 2990. Skilled persons will appreciate that various optical devices and associated instrumentation (e.g., CCD camera and associated zoom lens optics) may be employed to study and record physical attributes or phenomena of a trapped particle or group of particles. For example, instrumentation shown in FIG. 29 may record displacement of a trapped particle over time because, in some experiments such as the one shown in FIG. 32, exerted trapping forces are nearly proportional to displacement such that a trap can be modeled as a linear spring. The trap stiffness and other properties of the trap are a function of the location, the trapped particle (e.g., the bead diameter or bead composition), the optical properties of a surrounding medium, and laser power. In general, MCF 2920 carries relatively low-power laser beams and may therefore have plastic (e.g., acrylic) cores. MCFs of the type suitable for optical trapping are available from Fibercore of Southampton Science Park, United Kingdom. Some specific embodiment are introduced in FIGS. 27 and 30.

FIG. 27, for example, shows MCF 2700 including multiple spaced-apart, non-coaxial confinement regions or cores in an azimuthally asymmetric arrangement. Thus, the outer confinement cores are mutually azimuthally spaced apart. From top-to-bottom or side-to-side, cores shown in FIG. 27 are also mutually linearly spaced apart.

FIG. 27 also shows that different cores may optionally possess different NAs, which provide a tunable solution for changing optical trapping properties without changing laser sources, objectives, or environmental conditions. For example, a central core 2720 has an NA of 0.08 to establish at its output end an optical trap having more confined (dense) and thus stronger electric field (more trapping force), whereas an outer core 2730 has an NA of 0.22 to establish at its output end an optical trap having relatively decreased trapping force.

Figure 30:
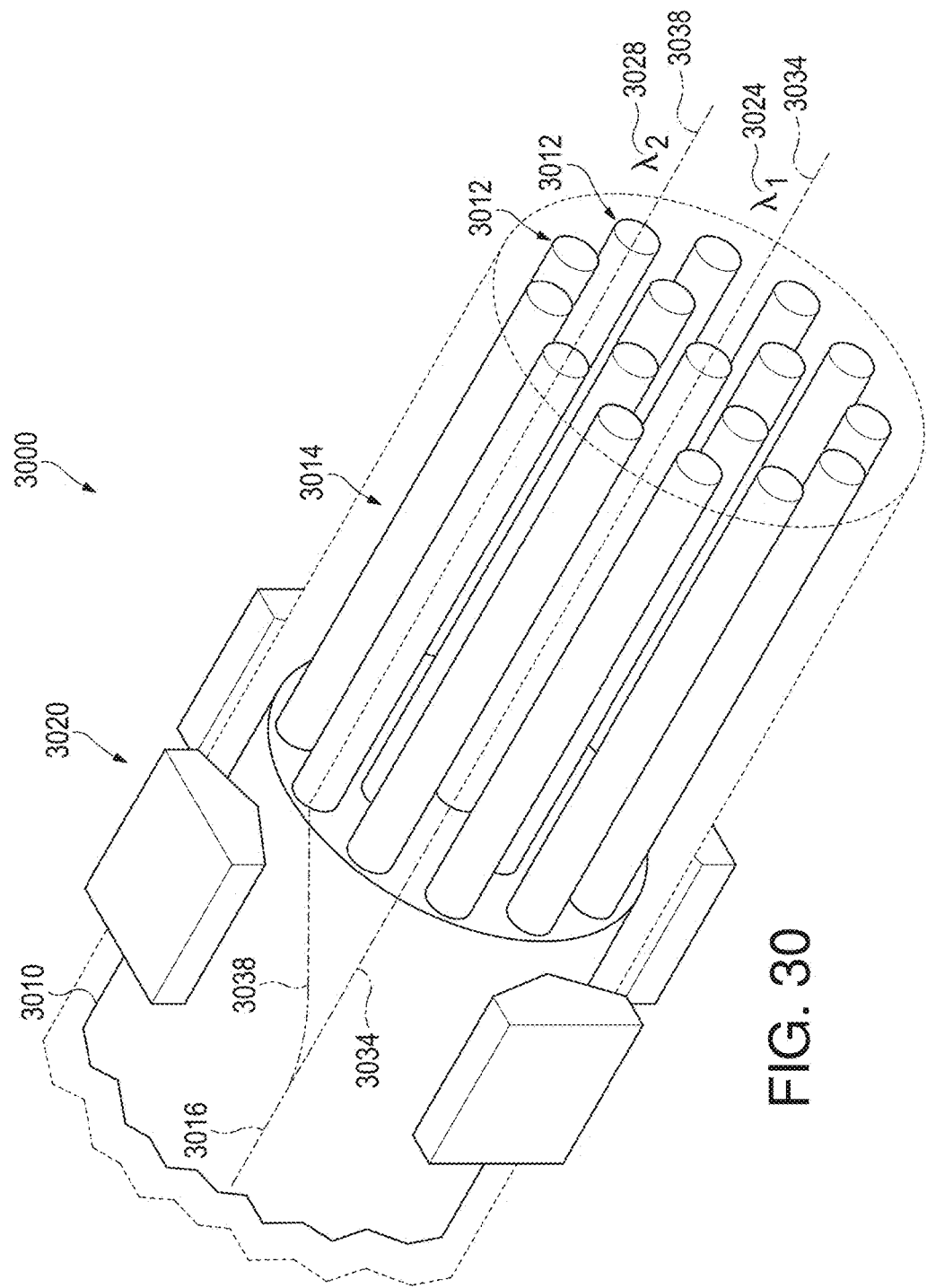
FIG. 30 is an isometric view of a fiber structure for use in the optical probe of FIG. 29, according to one embodiment.

FIG. 30 shows an enlarged view of a VBC fiber 3000, according to another embodiment. In this example, VBC fiber 3000 has a first GRIN fiber 3010 that is wavelength discriminatory—meaning that different wavelengths of light passing through first GRIN fiber 3010 will move to different confinement core positions 3012 of an MCF 3014 for confinement along corresponding propagation paths as VBC fiber 3000 is bent. For example, an initial, multi-wavelength optical beam 3016 (shown simplified as an optical axis) is, in response to an applied perturbation applied from a perturbation device 3020, spatially separated into a plurality of its wavelength components. In the example of FIG. 30, a multi-wavelength laser source (not shown) produces optical beam 3016 having a first wavelength component 3024 and a second wavelength component 3028. And in response to an applied perturbation, optical beam 3016 is modified to form an adjusted optical beam including a centrally confined portion (also referred to as central optical beam) 3034 having first wavelength component 3024 and a radially displaced confined portion (also referred to as radially displaced optical beam) 3038 having second wavelength component 3028. Skilled persons will appreciate that wavelength components typically include ranges of wavelengths.

The displacement between portions 3034 and 3038 is attributable to first GRIN fiber 3016 modifying beam characteristics of one portion to a different degree due to one wavelength responding more to applied perturbations. Relatedly, some particles interact with particular wavelengths of light to a greater degree than other wavelengths. Accordingly, in some embodiments, VBC fiber 3000, optical beam 3016, or both may be tailored to optimize the interaction between specific small particles and their corresponding "best fit" wavelength of light that traps or even repels the particles in a desired manner. For example, the NA, sizes, radial positions, or other features of cores in an MCF may be customized to facilitate the desired interactions between small particles of different species, compounds, or elements. MCFs for optical probes are particularly amenable to such customizations due to the use of relatively low power beams, which enables refractive material in first GRIN fiber 3010 to possess a highly customizable RIP that need not accommodate high power beams.

Figure 31:
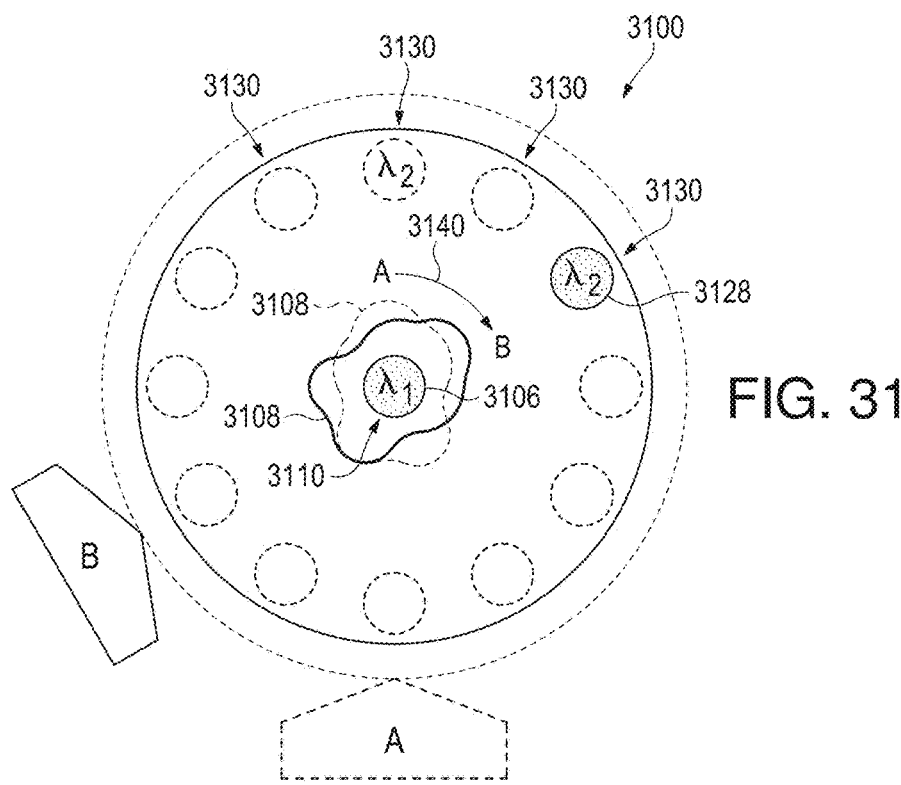
FIG. 31 is a top plan view representing results of a first type of optical probing experiment employing the optical probe of FIG. 29 and the fiber structure of FIG. 30.

FIG. 31 shows one type 3100 of experimental use of VBC fiber 3000. Central optical beam 3034 (FIG. 30) forms a central optical trap 3106 that traps a small particle 3108 at a central optical trap location 3110. Concurrently, radially displaced optical beam 3038 (FIG. 30) is sequentially moved to different (peripheral) core positions 3012 (FIG. 30) so as to excite those peripheral cores in emitting a peripheral optical trap 3128 that moves to different peripheral locations 3130 as the sequence progresses. Movement of peripheral optical trap 3128 serves several purposes, depending on the experiment. In the present example experiment 3100, the movement generates a rotational force 3140 applied to particle 3108 as a selected state of perturbation changes in direction from an initial state "A" (represented in broken lines) to a subsequent state "B" (represented in solid lines).

Figure 32:
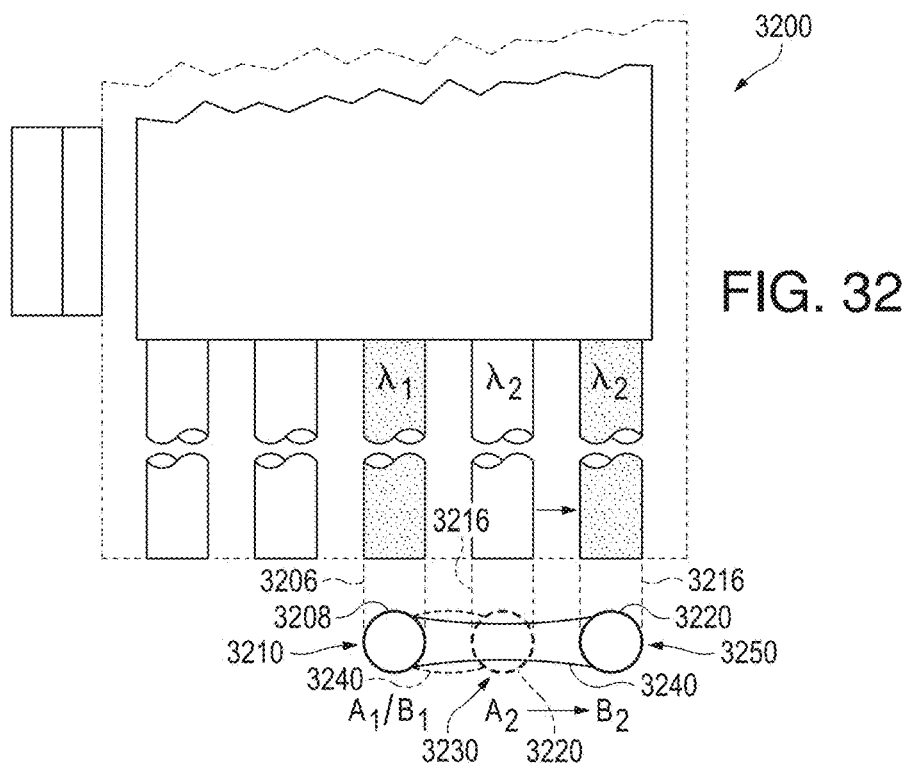
FIG. 32 is a side elevation view representing results of a second type of optical probing experiment employing the optical probe of FIG. 29 and the fiber structure of FIG. 30.

FIG. 32 shows another type 3200 of experimental use of VBC fiber 3000. Central optical beam 3034 (FIG. 30) forms a central optical trap 3206 that holds a first bead 3208 at a central optical trap location 3210. Concurrently, radially displaced optical beam 3038 (FIG. 30) forms a laterally displaced optical trap 3216 that holds a second bead 3220 at a first lateral optical trap location 3230. Between two beads is a material 3240 under test. To apply force to (i.e., stretch) material 3240, a propagation path of radially displaced optical beam 3038 (FIG. 30) is adjusted to direct it to a different core location and thereby move laterally displaced optical trap 3216 to a second lateral optical trap location 3250.

More generally, movement of a second optical trap can be used to orient or move a second particle with respect to a first particle such that they may interact in a controlled and predictable way in space. Some other embodiments may orient a plurality of particles in a variety of spatial orientations. In another embodiment, a set of cores is provided, in which one or more members of the set provide different trapping properties than other members of the set. For example, FIG. 28 shows fiber 2800 having at least one crescent shaped core, which would generate different trapping properties relative to cores of other shapes. In another example, a distal end of one or more members in a set may be tapered or lensed so as to tailor the distal fiber structure (e.g., differently than or the same as other fibers) and establish desired beam characteristics delivered to the sample.

Having described and illustrated the general and specific principles of examples of the presently disclosed technology, it should be apparent that the examples may be modified in arrangement and detail without departing from such principles. We claim all modifications and variation coming within the spirit and scope of the following claims.

The invention claimed is:

1. An optical beam delivery device configured to establish, from an optical beam, an optical trap that is moveable to different optical trap locations, the optical beam delivery device comprising:
   a first length of fiber having a first refractive index profile (RIP) for propagation of the optical beam along a propagation path, the first RIP enabling, in response to an applied perturbation, modification of the propagation path to form an adjusted optical beam that is movable to propagate along different propagation paths in response to different states of the applied perturbation; and
   a second length of fiber functionally directly coupled through a fiber-coupling interface with the first length of fiber and having multiple spaced-apart, non-coaxial confinement cores defining a second RIP, the confinement cores occupying different positions in, and corresponding to different optical trap locations at an output of, the second length of fiber such that, in response to a selected state of the different states of the applied perturbation, at least a portion of the adjusted optical beam is directed to a position of a selected corresponding one of the confinement cores and thereby provides at the output of the second length of fiber a corresponding one of the different optical trap locations.

2. The optical beam delivery device of claim 1, in which the different optical trap locations include first and second optical trap locations that are different from each other and correspond to respective first and second ones of the confinement cores, and in which the optical beam comprises a multi-wavelength optical beam having first and second wavelengths for direction to, respectively, the first and second confinement cores.

3. The optical beam delivery device of claim 2, in which the second optical trap location is moveable relative to the first optical trap location in response to the different states of the applied perturbation.

4. The optical beam delivery device of claim 1, in which the confinement cores comprise mutually azimuthally spaced-apart confinement cores.

5. The optical beam delivery device of claim 1, in which the confinement cores comprise mutually linearly spaced-apart confinement cores.

6. The optical beam delivery device of claim 1, in which different pairs of confinement cores from among the multiple confinement cores are selectable to receive two spaced-apart portions of the adjusted optical beam for producing two spaced-apart optical traps.

7. The optical beam delivery device of claim 1, in which at least one confinement core of a selected pair of the different pairs of confinement cores is moveable relative to the other confinement core of the selected pair.

8. The optical beam delivery device of claim 1, in which a first one of the confinement cores has a first numerical aperture (NA) and a second one of the confinement cores has a second NA that is different from the first NA.

9. The optical beam delivery device of claim 1, further comprising a multi-wavelength laser source to produce the optical beam.

10. The optical beam delivery device of claim 1, further comprising a perturbation device to produce the applied perturbation.

11. The optical beam delivery device of claim 10, in which the perturbation device includes an actuator and a controller to control in two or more axes the selected state of the different states of applied perturbation.

12. The optical beam delivery device of claim 10, in which the perturbation device is configured to impart, at selected radial locations, bending of one or both of the first and second lengths of fiber.

13. The optical beam delivery device of claim 10, in which first RIP includes a parabolic region.

14. The optical beam delivery device of claim 1, in which the different states of the applied perturbation are different radii of bend of the optical beam delivery device.

15. The optical beam delivery device of claim 1, in which the different states of the applied perturbation are different directions of bend of the optical beam delivery device.

16. The optical beam delivery device of claim 1, in which the first and second RIPs are different from each other.

17. An optical probe including the optical beam delivery device of claim 1.

18. The optical beam delivery device of claim 1, in which the first RIP is a waveguide configured to impart transverse displacement in response to the applied perturbation.

19. The optical beam delivery device of claim 1, in which the second length of fiber is fused to the first length of fiber such that ends of the fibers abut each other.

20. The optical beam delivery device of claim 1, in which the first length of fiber is configured to receive the optical beam from an input fiber.

21. The optical beam delivery device of claim 1, in which the first length of fiber includes an output fused to an input of the second length of fiber.

22. The optical beam delivery device of claim 1, in which the fiber-coupling interface includes an index-matching material.

23. The optical beam delivery device of claim 1, in which the fiber-coupling interface includes a splice.

24. The optical beam delivery device of claim 1, in which the fiber-coupling interface includes a fiber joint.

25. The optical beam delivery device of claim 1, in which the fiber-coupling interface includes a connector.

26. The optical beam delivery device of claim 1, in which the fiber-coupling interface maintains a substantially unaltered operative relationship between the first and second RIPS.

* * * * *